US012214879B2

(12) United States Patent
Kelly

(10) Patent No.: US 12,214,879 B2
(45) Date of Patent: Feb. 4, 2025

(54) AIRCRAFT WING WITH TRAILING EDGE FLIGHT CONTROL SURFACE

(71) Applicant: Airbus Operations Limited, Bristol (GB)

(72) Inventor: Mark Shaun Kelly, Bristol (GB)

(73) Assignee: Airbus Operations Limited, Bristol (GB)

( * ) Notice: Subject to any disclaimer, the term of this patent is extended or adjusted under 35 U.S.C. 154(b) by 377 days.

(21) Appl. No.: 17/733,080

(22) Filed: Apr. 29, 2022

(65) Prior Publication Data

US 2023/0024601 A1  Jan. 26, 2023

Related U.S. Application Data

(63) Continuation of application No. PCT/EP2020/080001, filed on Oct. 26, 2020.

(30) Foreign Application Priority Data

Nov. 1, 2019 (GB) ...................................... 1915951
Nov. 1, 2019 (GB) ...................................... 1915952

(51) Int. Cl.
*B64C 9/20* (2006.01)
*B64C 3/28* (2006.01)
(Continued)

(52) U.S. Cl.
CPC .................. *B64C 9/20* (2013.01); *B64C 3/28* (2013.01); *B64C 3/54* (2013.01); *B64C 9/02* (2013.01);
(Continued)

(58) Field of Classification Search
CPC .................................... B64C 7/00; B64C 9/02
See application file for complete search history.

(56) References Cited

U.S. PATENT DOCUMENTS 2,352,062 A    6/1944  Zap
4,763,862 A *  8/1988  Steinhauer ................ B64C 9/18
                                                   244/215

(Continued)

FOREIGN PATENT DOCUMENTS

FR    1 497 434 A   10/1967
GB    2 568 731 A    5/2019

OTHER PUBLICATIONS

International Search Report and Written Opinion for Application No. PCT/EP2020/080001 dated Nov. 11, 2020.

*Primary Examiner* — Richard Green
*Assistant Examiner* — Nevena Aleksic
(74) *Attorney, Agent, or Firm* — KDW Firm PLLC

(57) ABSTRACT

An aircraft wing having a main wing and a trailing edge flight control surface movable between a retracted position, a first extended position in which the control surface is positioned rearwardly in the chord wise direction relative to its retracted position, and a second extended position in which the control surface is rotated relative to its retracted position. A closure panel, mounted to the main wing, extends from the main wing to the control surface, to provide an air flow surface between the main wing and control surface, both when the control surface is in its retracted position and its first extended position. The closure panel is movable, relative to the control surface, to an open configuration in which it opens an airflow passage provided between the control surface and an opposed surface of the aircraft wing when the control surface is in its second extended position.

18 Claims, 5 Drawing Sheets

(51) Int. Cl.
*B64C 3/54* (2006.01)
*B64C 9/02* (2006.01)
*B64C 9/14* (2006.01)
*B64C 9/32* (2006.01)

(52) U.S. Cl.
CPC ........ *B64C 9/323* (2013.01); *B64C 2009/143* (2013.01)

(56) References Cited

U.S. PATENT DOCUMENTS 9,688,384 B1* 6/2017 Balzer ................. B64C 9/02
2017/0174313 A1* 6/2017 Brakes ................. B64C 9/16

* cited by examiner

AIRCRAFT WING WITH TRAILING EDGE FLIGHT CONTROL SURFACE

CROSS-REFERENCE TO RELATED APPLICATIONS

This application is a continuation of and claims priority to PCT/EP2020/080001 filed Oct. 26, 2020, which claimed priority to GB Patent Application No. 1915951.6 filed Nov. 1, 2019, and GB Patent Application No. 1915952.4 filed Nov. 1, 2019, the entire disclosures of which are incorporated by reference herein.

TECHNICAL FIELD

The disclosure herein relates to an aircraft wing having a main wing and a trailing edge flight control surface which is movable so as to vary the wing area and camber of the wing. The flight control surface is in particular, but not exclusively, a flap. The disclosure herein also relates to an aircraft comprising the aircraft wing and to a method of changing the position of a trailing edge flight control surface to vary the area and camber of a wing.

BACKGROUND

It is known to provide aircraft wings with control surfaces that are movable so as to vary the camber and/or area of the wing so as to provide variable aerodynamic properties of the wing. However, the arrangement of the control surfaces can negatively impact the aerodynamic properties of the wing, for example due to gaps and/or other disturbances in the surface of the wing, due to the mounting arrangement of the control surface to the main wing.

The disclosure herein seeks to address or mitigate at least some of the above-mentioned problems. Alternatively, or additionally, the disclosure herein seeks to provide an improved aircraft wing having a main wing and a trailing edge flight control surface. Alternatively, or additionally, the disclosure herein seeks to provide an improved aircraft comprising such an aircraft wing. Alternatively, or additionally, the disclosure herein seeks to provide an improved method of changing the position of a trailing edge flight control surface to vary the area and camber of a wing.

SUMMARY

According to a first aspect of the disclosure herein there is provided an aircraft wing comprising a main wing and a trailing edge flight control surface;
the aircraft wing being configured such that the flight control surface is movable between a retracted position, a first extended position in which the control surface is positioned rearwardly in the chord wise direction relative to its retracted position, and a second extended position in which the control surface is rotated relative to its retracted position;
wherein the aircraft wing comprises a closure panel, mounted to the main wing, such that the chord wise position of the control surface relative to that of the closure panel is varied, as the control surface is moved between its retracted position and its first extended position;
and wherein the aircraft wing is configured such that the closure panel extends from the main wing to the control surface, to provide an air flow surface between the main wing and control surface, both when the control surface is in its retracted position and its first extended position; and such that the closure panel is movable, relative to the control surface, to an open configuration in which it opens an airflow passage provided between the control surface and an opposed surface of the aircraft wing when the control surface is in its second extended position.

The wing area and camber may be variable by varying the position of the control surface, to optimise the wing for different flight conditions and flight phases. The closure panel may provide for improved aerodynamic properties, for example by preventing air flowing into a gap between the main wing and control surface. Furthermore, the closure panel may allow the main wing and control surface (together with the closure panel) to have a substantially clean aerodynamic shape for these different wing geometries, thereby providing for improved aerodynamic properties. In addition, the open configuration of the closure panel may allow the aircraft wing to have a slotted flap type arrangement, when the control surface is in its second extended position, thereby allowing the control surface to be operated at relatively high angles of attack without stalling.

It will be appreciated that when the flight control surface is positioned 'rearwardly in the chord wise direction' relative to its retracted position, it does not have to be aligned on the chord wise axis of the wing. For example, it may be positioned rearwardly in the chord wise direction and positioned above or below the chord wise axis and/or rotated. In this respect, as the flight control surface moves between its retracted position and its extended position it may move up and/or down and/or rotate as it moves rearwardly in the chordwise direction.

In embodiments of the disclosure herein, when the control surface is in its retracted position it is spaced from the main wing such that a gap is defined between the main wing and the control surface. Optionally when the control surface is in its retracted position the closure panel extends across the gap. Optionally the closure panel substantially closes a side of the gap.

In embodiments of the disclosure herein the flight control surface is movably mounted to the main wing such that it is movable between the retracted position, first extended position and second extended position. The flight control surface may be slidably mounted on a track.

In embodiments of the disclosure herein, when the control surface is in its first extended position it is spaced from the main wing such that a gap is defined between the main wing and the control surface. Optionally when the control surface is in its first extended position the closure panel extends across the gap. Optionally the closure panel substantially closes a side of the gap.

In embodiments of the disclosure herein an outer surface of the closure panel forms the airflow surface. It will be appreciated that an "air flow" surface is a surface that is exposed to airflow during use of the aircraft wing.

In embodiments of the disclosure herein, the aircraft wing is configured such that closure panel is in contact with the control surface, when the control surface is in its retracted position and its first extended position.

Optionally the closure panel comprises a panel body and when the control surface is in its retracted position and its first extended position, the closure panel body is in contact with the control surface. Alternatively, a sealing member may be mounted on a surface of the closure panel body, so as to seal against a surface of the control surface (when the control surface is in its retracted position and its first extended position). It will be appreciated that, in this case, the 'closure panel' comprises the sealing member. Alternatively, or additionally, a sealing member may be mounted on a surface of the control surface, so as to seal against a surface of the closure panel (when the control surface is its retracted position and its first extended position). It will be appreciated that, in this case, the 'control surface' comprises the sealing member.

In embodiments of the disclosure herein, when the control surface is in its retracted position and its first extended position, an outer surface of the main wing, the air flow surface (provided by the closure panel), and an outer surface of the control form a substantially clean aerodynamic shape. In this respect, these surfaces may form a substantially smooth shape. There may be substantially no gap between an outer surface of the main wing and the air flow surface (provided by the closure panel). There may be substantially no gap between the air flow surface (provided by the closure panel) and the outer surface of the control surface.

The outer surfaces of the main wing and control surface may be lower surfaces of the main wing and control surface. In this respect, the closure panel may extend from a lower surface of the main wing to a lower surface of the control surface. Alternatively, the outer surfaces of the main wing and control surface may be upper surfaces of the main wing and control surface. In this respect, the closure panel may extend from an upper surface of the main wing to an upper surface of the control surface.

In embodiments of the disclosure herein, when the control surface is in its retracted position and its first extended position the air flow surface may form a continuation of the outer surface of the main wing. When the control surface is in its retracted position and its first extended position the outer surface of the control surface may form a continuation of the air flow surface.

Optionally the closure panel is movably mounted to the main wing and the aircraft wing comprises an actuation mechanism configured to move the closure panel such that it extends from the main wing to the control surface, to provide the air flow surface, both when the control surface is in its retracted position and its first extended position.

In this respect, optionally when the control surface is in its retracted position the control surface is in a first position and when the control surface is in its first extended position the closure panel is in a second position. It will be appreciated that the second position is a different position to the first position.

The closure panel may be movably mounted to the main wing so as to rotate and/or translate relative to the main wing. In embodiments of the disclosure herein the closure panel is rotatably mounted to the main wing, i.e. so as to rotate relative to the main wing between the first and second positions.

The actuation mechanism may comprise a resiliently deformable member configured to bias the closure panel into contact with the control surface when the control surface is in its retracted position and its first extended position.

Optionally the closure panel extends from a lower surface of the main wing to a lower surface of the control surface, when the control surface is in its retracted position and its first extended position.

Optionally when the control surface is in its retracted position the closure panel extends across a gap between a lower surface of the main wing and a lower surface of the control surface. Optionally the closure panel substantially closes a lower side of the gap between the main wing and control surface.

Optionally when the control surface is in its first extended position the closure panel extends across a gap between a lower surface of the main wing and a lower surface of the control surface. Optionally the closure panel substantially closes a lower side of the gap between the main wing and control surface.

Optionally the closure panel extends from an upper surface of the main wing to an upper surface of the control surface, when the control surface is in its retracted position and its first extended position.

Optionally when the control surface is in its retracted position the closure panel extends across a gap between an upper surface of the main wing and an upper surface of the control surface. Optionally the closure panel substantially closes an upper side of the gap between the main wing and control surface.

Optionally when the control surface is in its first extended position the closure panel extends across a gap between an upper surface of the main wing and an upper surface of the control surface. Optionally the closure panel substantially closes an upper side of the gap between the main wing and control surface.

In embodiments of the disclosure herein the closure panel extends across substantially the span wise extent of the control surface.

Optionally the closure panel is a first closure panel and the first closure panel extends from a lower surface of the main wing to a lower surface of the control surface, to provide an air flow surface, when the control surface is in its retracted position and its first extended position;

and wherein the aircraft wing comprises a second closure panel, and the aircraft wing is configured such that the second closure panel extends from an upper surface of the main wing to an upper surface of the control surface, to provide an air flow surface, both when the control surface is in its retracted position and its first extended position.

The second closure panel may have any of the features of, or in relation to, the first closure panel.

Optionally an actuation mechanism is configured to actuate the second closure panel such that it extends from the upper surface of the main wing to the upper surface of the control surface, to provide the air flow surface, both when the control surface is in its retracted position and its first extended position.

Optionally the aircraft wing is configured such that when the control surface is in its retracted position it is at least partially received between the first and second closure panels.

Optionally the aircraft wing is configured such that the closure panel extends from the main wing to the control surface, to provide the air flow surface between the main wing and control surface, as the control surface is moved from between its retracted position and its first extended position, i.e. for each position of the control surface between its retracted position and its first extended position.

In this respect, optionally the aircraft wing is configured such that the closure panel extends from the main wing to the control surface, to provide the air flow surface between the main wing and control surface, when the wing is in a plurality of positions that are positioned rearwardly in the chord wise direction relative to the retracted position.

Optionally the aircraft wing comprises a spoiler and the spoiler comprises the closure panel.

Optionally the closure panel has an inner surface that has a complimentary shape to that of an outer surface of the control surface.

Optionally the first and second closure panels have opposed inner surfaces that have complimentary shapes to that of the lower and upper surfaces of the control surface respectively.

Optionally the closure panel comprises a deformable portion configured such that when it is in contact with control surface, it deforms so as to conform to the shape of the control surface.

Optionally the closure panel is movable to a position that allows the control surface to be retracted from the second extended position, for example to the first position and/or the retracted position. This may be such that the control surface is at least partially receivable between the first and second closure panels.

It will be appreciated that the flight control surface may be movable between the retracted position, first extended position and second extended position in any order of movement. For example, the control surface may be movable from the retracted position to the first extended position before it is movable to the second extended position. Alternatively, the control surface may be movable from the retracted position to the second extended position before it is movable to the first extended position.

The control surface may translate and/or rotate as it moves between the retracted position, first extended position and second extended position. As the control surface moves between its retracted position and its first extended position it is not necessary that the control surface moves in a direction that is substantially parallel to the chord wise direction. In this respect, it may move along a direction that has at least a component in the chord wise direction.

According to a second aspect of the disclosure herein there is provided an aircraft wing comprising a main wing and a trailing edge flight control surface; the aircraft wing being configured such that the flight control surface is movable between a retracted position, a first extended position in which the control surface is positioned rearwardly in the chord wise direction relative to its retracted position, and a second extended position in which the control surface is rotated relative to its retracted position;
wherein the aircraft wing comprises first and second closure panels, each closure panel being mounted to the main wing, such that the chord wise position of the control surface relative to that of the closure panel is varied, as the control surface is moved between its retracted position and its first extended position;
and wherein the aircraft wing is configured such that when the control surface is in its retracted position and its first extended position, the first closure panel extends from a lower surface of the main wing to a lower surface of the control surface, to provide an air flow surface between the lower surface of the main wing and the lower surface of the control surface and the second closure panel extends from an upper surface of the main wing to an upper surface of the control surface, to provide an air flow surface between the upper surface of the main wing and the upper surface of the control surface.

The aircraft wing has a wing area and camber that are variable (by varying the position of the control surface), to optimise the wing for different flight phases. The first and second closure panels may provide for improved aerodynamic properties, for example by preventing air flowing into a gap between the main wing and control surface. Furthermore, the first and second closure panels may allow the main wing and control surface (together with the closure panel) to have a substantially clean aerodynamic shape for these different wing geometries, thereby providing for improved aerodynamic properties.

Optionally the first and/or second closure panels, an actuation mechanism is configured to actuate the closure panel such that it extends from the main wing to the control surface, to provide the air flow surface, both when the control surface is in its retracted position and its first extended position.

According to a third aspect of the disclosure herein there is provided an aircraft comprising an aircraft wing according to any preceding aspect of the disclosure herein.

According to a fourth aspect of the disclosure herein there is provided a method of changing the position of a trailing edge flight control surface of an aircraft wing, comprising:
moving the flight control surface between a retracted position, a first extended position in which the control surface is positioned rearwardly in the chord wise direction relative to its retracted position, and a second extended position in which the control surface is rotated relative to its retracted position;
wherein the aircraft wing comprises a closure panel, mounted to the main wing, such that the chord wise position of the control surface relative to that of the closure panel is varied, as the control surface is moved between its retracted position and its first extended position;
and wherein the closure panel extends from the main wing to the control surface, to provide an air flow surface between the main wing and control surface, both when the control surface is in its retracted position and its first extended position;
and wherein the closure panel is moved, relative to the control surface, to an open configuration in which it opens an airflow passage provided between the control surface and an opposed surface of the aircraft wing when the control surface is in its second extended position.

According to a fifth aspect of the disclosure herein there is provided a method of changing the position of a trailing edge flight control surface of an aircraft wing, comprising:
moving the flight control surface between a retracted position, a first extended position in which the control surface is positioned rearwardly in the chord wise direction relative to its retracted position, and a second extended position in which the control surface is rotated relative to its retracted position;
wherein the aircraft wing comprises first and second closure panels, each closure panel being mounted to the main wing, such that the chord wise position of the control surface relative to that of the closure panel is varied, as the control surface is moved between its retracted position and its first extended position;
and wherein when the control surface is in its retracted position and its first extended position, the first closure panel extends from a lower surface of the main wing to a lower surface of the control surface, to provide an air flow surface between the lower surface of the main wing and the lower surface of the control surface and the second closure panel extends from an upper surface of the main wing to an upper surface of the control surface, to provide an air flow surface between the upper surface of the main wing and the upper surface of the control surface.

The trailing edge flight control surface may be a flap, aileron, flaperon, or any other flight control surface used on an aircraft wing, as will be appreciated by the skilled person.

In embodiments of the disclosure herein the trailing edge flight control surface is a flap. It may, for example, be a plain flap, a split flap, a slotted flap, a Fowler flap, or any other flight control surface as would be understood by a skilled person.

According to a sixth aspect of the disclosure herein there is provided a control unit for a variable geometry aircraft, configured to:

a) receive a value concerning at least one parameter, sensed by a sensing arrangement of an aircraft; and b) derive a value concerning a lift to drag ratio of the aircraft, or of part of the aircraft, at at least one geometry of the aircraft, in dependence on the value concerning the at least one sensed parameter.

The control unit may allow the geometry of the aircraft to be controlled, either automatically or manually, so as to control a value concerning a lift to drag ratio of the aircraft, or of part of the aircraft. This may advantageously provide an additional 'axis' of control of the aircraft, i.e. an additional parameter than can be controlled.

As the value concerning the lift to drag ratio is derived from a value concerning at least one parameter, sensed by a sensing arrangement of an aircraft, this may allow for a determination of the lift to drag ratio that is relatively accurate and that takes into account the current flight condition of the aircraft.

It may, for example, allow the aircraft to be flown at a maximum achievable lift to draft ratio of the aircraft at different flight conditions. In this respect, it may allow the aircraft to be controlled to have a first geometry during climb such that the lift to drag ratio of the aircraft is maximised during climb and to have a second geometry during cruise such that the lift to drag ratio of the aircraft is maximised during cruise. This may advantageously allow for fuel burn of the aircraft to be reduced.

As a further example, it may allow the geometry of the aircraft to be controlled to minimise the lift to drag ratio of the aircraft, for example during descent (on landing approach) so as to slow the aircraft.

The lift to drag ratio may be derived in dependence on the value concerning the at least one sensed parameter by being derived directly or indirectly from that parameter. In this respect, the lift to drag ratio may be derived using that parameter. The at least one sensed parameter may be used to derive another parameter (a 'derived' parameter), via one more steps in the derivation (using any type of mathematical operator (including integration or differentiation) interpolation, etc.), with the lift to drag ratio being derived using the derived parameter. The lift to drag ratio be derived using the value concerning the at least one sensed parameter in combination with values concerning one or more other sensed parameters, one or more derived parameters (i.e. parameters derived from the one or more sensed parameters) and/or with one or more determined variations of one or more parameters (sensed or derived) with one or more other parameters (sensed or derived).

The lift to drag ratio may be derived using the value concerning the at least one sensed parameter in combination with a determined variation of one or more parameters (sensed or derived) with one or more other parameters (sensed or derived).

It will be appreciated that the value concerning the at least one parameter is a current sensed value concerning the at least one parameter, i.e. at that point in time.

The sensing arrangement may comprise one or more sensors.

The at least one parameter may be a plurality of parameters. In this respect, the control unit may be configured to receive values concerning a plurality of parameters sensed by the sensing arrangement of the aircraft. In this case, the sensing arrangement may comprise a plurality of sensors.

The at least one parameter may comprise a parameter of the airflow, i.e. of the airflow being experienced by the aircraft. The at least one parameter may, for example, comprise the pressure (total pressure, static pressure and/or dynamic pressure), density, outside air temperature, airspeed, velocity, Mach number and/or angle of attack of the airflow being experienced by the aircraft. The at least one parameter may be measured at any suitable position in the airflow.

The at least one parameter may comprise a parameter of the geometry of the aircraft. In this respect, the parameter may be a position (the translational and/or rotational position) of one more surfaces of the aircraft that are movable to vary the geometry of the aircraft.

Optionally the control unit is configured to derive the value concerning the lift to drag ratio, at at least one geometry of the aircraft, at a current flight condition of the aircraft, wherein the current flight condition is defined by a set of parameters, the set of parameters comprising at least one parameter that is sensed by a sensing arrangement of the aircraft or is derived in dependence on at least one parameter that is sensed by a sensing arrangement of the aircraft.

The sensed parameter, which the flight condition is defined in dependence on, and the respective sensing arrangement, may be the same as or different to the sensed parameter that the value concerning the lift to draft ratio is derived in dependence on and the respective sensing arrangement.

The flight condition may be a set of parameters comprising one or more sensed parameters and/or one or more derived parameters. It will be appreciated that a variation in the flight condition is a variation in the value of one or more of the parameters that form the set.

In this respect, a sensed parameter is a parameter sensed by a sensing arrangement of the aircraft and a derived parameter is a parameter derived from a sensed parameter. For example, a sensed parameter could be the angle of attack of the aircraft and a derived parameter could be a lift coefficient derived from the angle of attack (for example using a stored variation of the lift coefficient with angle of attack).

Where a parameter is derived in dependence on another parameter, it may be derived directly or indirectly from that parameter. Furthermore, it may be derived from that parameter in combination with one or more other values, including parameters, stored variations of certain parameters with other parameters, etc.

The flight condition may be defined by at least one airflow parameter (sensed by a sensing arrangement of the aircraft). In this respect, an airflow parameter is a parameter concerning the airflow experienced by the aircraft, for example the pressure, outside air temperature, density, velocity of the aircraft (i.e velocity of the air relative to the aircraft), Mach number, angle of attack of the aircraft (which relates to the angle of the airflow), etc.

The control unit may be configured to define the flight condition, i.e. which set of parameters defines the flight condition.

Optionally the flight condition is defined, at least in part, by a parameter concerning the lift generated by the aircraft, or the part of the aircraft, respectively. The flight condition may only be defined only by this parameter.

Optionally the flight condition is defined, at least in part, by a parameter concerning the lift generated by the aircraft, or the part of the aircraft, respectively and the Mach number that the aircraft is flying at. The flight condition may be defined by only these two parameters (i.e. the flight condition is defined by the combination of these two parameters).

Optionally the control unit is configured to derive the value concerning the lift to drag ratio at at least one non-current geometry of the aircraft, at the current flight condition, which may be a plurality of non-current geometries of the aircraft.

It will be appreciated that a 'non-current' geometry of the aircraft is a geometry of the aircraft, that the variable geometry of the aircraft may be controlled to, that is different to the current geometry of the aircraft.

Optionally the control unit is configured to derive a variation in the value concerning the lift to drag ratio with the variable geometry of the aircraft, at the current flight condition.

Optionally the control unit is configured to use a stored variation of the value concerning the lift to drag ratio with a variation in the variable geometry of the aircraft (by controlling the variable geometry of the aircraft) and with a variation in the flight condition to derive the value concerning the lift to drag ratio, at at least one geometry of the aircraft, at the current flight condition.

The control unit may comprise the stored variation. The stored variation may, for example, be a look-up table, an equation, or any other suitable type of stored variation. The stored variation may be determined using empirical or theoretical means.

The control unit may comprise a memory that contains the stored variation.

Optionally the control unit is configured such that the stored variation is updated based on a further derivation of the variation of the value concerning the lift to drag ratio with a variation in the geometry of the aircraft and with a variation in the flight condition.

This may, for example, be via machine learning, a neural network, or any other form of artificial intelligence, for example.

Optionally the control unit is configured to determine the maximum and/or minimum values concerning the lift to drag ratio that are achievable by varying the geometry of the aircraft, at the current flight condition.

Optionally the control unit is configured to determine the geometry of the aircraft that provides the maximum and/or minimum value concerning the lift to drag ratio.

Optionally the control unit is configured to derive the value concerning the lift to drag ratio at the current geometry of the aircraft. This may allow for closed loop control of the value concerning the lift to drag ratio.

In embodiments of the disclosure herein the control unit is configured to continuously derive the value concerning the lift to drag ratio, at the at least one geometry of the aircraft, in dependence on a continuous sensing of the at least one parameter. In this respect, the control unit may derive the lift to drag ratio in real time, based on the sensing of at least one parameter in real time.

Alternatively, the control unit may be configured to provide discrete values for the lift to drag ratio, in dependence on discrete values of the at least one sensed parameter (for example that are spaced apart in time).

Optionally the control unit is configured to derive a value concerning the lift generated by the aircraft, or the part of the aircraft, in dependence on at least one parameter, sensed by a sensing arrangement of the aircraft. This may be such that the value concerning the lift to drag ratio can be controlled in dependence on the determined value concerning the lift generated.

The sensed parameter, which the value concerning the lift generated by the aircraft is derived in dependence on, and the respective sensing arrangement, may be the same as or different to the above-mentioned sensed parameters and respective sensing arrangements.

Optionally the control unit is configured to determine the value concerning the lift to drag ratio in dependence on the value concerning lift.

The value concerning lift may be a lift coefficient of the aircraft, or of the part of the aircraft. The lift coefficient may be a dimensionless number that is representative of the lift generated by the aircraft, of the part of the aircraft, while removing the effects of velocity, density and geometry (e.g. planform area). The control unit may be configured to derive the lift coefficient in dependence on the at least one sensed parameter. This may be derived in dependence on a sensed pressure. Alternatively, or additionally, it may be derived in dependence on a sensed angle of attack.

Optionally the control unit is configured to use a stored variation of one or more parameters with the value concerning lift to derive the value concerning lift at a current condition of the aircraft. For example, the stored variation may be of how an area (e.g. a wing area) of the aircraft varies with a variation in geometry of the aircraft. The stored variation may be of how the value concerning lift varies with angle of attack.

The control unit may comprise the stored variation. The stored variation may, for example, be a look-up table, an equation, or any other suitable type of stored variation. The stored variation may be determined using empirical or theoretical means.

The control unit may comprise a memory that contains the stored variation.

Optionally the control unit is configured such that the stored variation is updated based on a further derivation of the respective variation. This may, for example, be via machine learning, for example a neural network, or any other form of artificial intelligence.

The control unit may be configured to receive at least one sensed parameter concerning the geometry of the aircraft. The control unit may be configured to determine the geometry of the aircraft in dependence on the sensed parameter concerning the geometry of the aircraft.

Optionally the control unit is configured to provide a control command output, for controlling a geometry of the aircraft, to control the value related to the lift to drag ratio.

Optionally the control unit is configured to control the geometry of the aircraft, in dependence on the derived value concerning the lift to drag ratio at the at least one geometry of the aircraft, so as to control to a determined value concerning the lift to drag ratio.

Optionally the control unit is configured to control the geometry of the aircraft, at a plurality of flight conditions, such that the value concerning the lift to drag ratio is substantially the maximum achievable at each of those flight conditions.

Optionally the control unit is configured to control the geometry of the aircraft such that, during climb and cruise, the value concerning the lift to drag ratio is substantially the maximum achievable during climb and cruise respectively.

Optionally the control unit is configured to provide an output communication signal, for communicating a derived value concerning the current lift to draft ratio to a pilot of the aircraft.

Optionally the output communication signal is for communicating the value concerning the lift to drag ratio at the at least one non-current geometry of the aircraft to the pilot.

Optionally the output communication signal is for communicating the derived maximum and/or minimum values to the pilot.

Optionally the control unit is configured to control a surface of the aircraft, so as to control forces and/or moments on the aircraft, and wherein the control unit is configured to control the surface, such that forces and/or moments on the aircraft, about at least one axis of the aircraft, are balanced at a plurality of different aircraft geometries that are controlled to control the value related to lift to drag ratio.

The control unit may be computer implemented. In this respect, the control unit may be implemented in hardware, for example computerized systems of the aircraft, by computer software. It will be appreciated of course that similar functions may be achieved by means other than software. A suitably arranged electronic circuit, whether or not comprising a programmable processing unit, could achieve an equivalent function.

The control unit may comprise a processing unit connected to at least one memory configured to store the stored variation (or the stored variations).

According to a seventh aspect of the disclosure herein there is provided a control unit for a variable geometry aircraft, configured to:
a) receive a value concerning at least one parameter, sensed by a sensing arrangement of an aircraft;
b) derive a value concerning the lift generated by the aircraft, or by the part of the aircraft, in dependence on the at least one sensed parameter; and
c) control a geometry of the aircraft, as to control a value related to a lift to drag ratio of the aircraft, or of part of an aircraft, in dependence on the derived value concerning the lift.

Optionally the control unit is configured to control the geometry of the aircraft such that, during both climb and cruise of the aircraft, the value concerning the lift to drag ratio is substantially the maximum that is achievable by varying the geometry of the aircraft.

According to an eighth aspect of the disclosure herein there is provided a control unit configured to control a geometry of an aircraft such that at a first lift coefficient, during climb, a value concerning a lift to drag ratio of the aircraft, or of part of the aircraft, is substantially the maximum achievable and at a second lift coefficient, during cruise, the value concerning the lift to drag ratio is substantially the maximum achievable.

Optionally the second lift coefficient is greater than the first lift coefficient.

According to a ninth aspect of the disclosure herein there is provided a control system comprising a control unit according to any preceding aspect of the disclosure herein and at least one actuator configured to actuate a surface of the aircraft so as to vary the value concerning the lift to drag ratio of the aircraft, by varying the geometry of the aircraft, wherein the actuator is controlled by the control unit.

In embodiments of the disclosure herein the control system comprises a sensing arrangement configured to provide the value concerning the at least one parameter to the control unit.

The sensing arrangement may comprise a pressure sensor, for sensing the pressure of the outside air. Alternatively, or additionally, it may comprise an angle of attack sensor. Alternatively, or additionally, it may comprise an outside air temperature sensor. Alternatively, or additionally, it may comprise a fuel burn sensor. Alternatively, or additionally, it may comprise a landing gear pressure sensor. Alternatively, or additionally, it may comprise an aircraft geometry position sensor. Alternatively, or additionally, it may comprise a rate of change of angle of control surface sensor.

The control unit may be connected to an actuator that is configured to control the surface of the aircraft (to control forces and/or moments on the aircraft).

The control unit may be connected to a pilot display, to display the derived value concerning the lift to drag ratio to a pilot.

The control unit may be configured to receive a control command input and to control the geometry of the aircraft in dependence on the control command input. The control command input may be from a pilot operated control. The control system may comprise a pilot operated control connected to the control unit to provide the control command input.

According to a tenth aspect of the disclosure herein there is provided a control system comprising a control unit according to any preceding aspect of the disclosure herein and at least one actuator configured to actuate a surface of the aircraft so as to vary the value concerning the lift to drag ratio of the aircraft, by varying the geometry of the aircraft, wherein the actuator is controllable by a pilot of the aircraft.

In embodiments of the disclosure herein the control system comprises the sensing arrangement.

According to an eleventh aspect of the disclosure herein there is provided a control unit or control system according to any preceding aspect of the disclosure herein wherein the geometry of the aircraft that is controllable is the geometry of a wing of the aircraft.

Optionally the geometry of the aircraft that is controllable is controllable between a plurality of positions. Optionally it is controllable to provide a continuous variation in geometry.

Optionally the aircraft geometry that is controllable is the area and/or camber of the wing. In this respect, the area and/camber of the wing may be varied by varying the position of a leading edge flight control surface and/or of a trailing edge flight control surface, for example.

Optionally the aircraft geometry is variable by varying a position of a trailing edge flight control surface. In this respect, optionally the position of the trailing edge flight control surface is controllable. The trailing edge flight control surface may be a flap, aileron, flaperon, or any other flight control surface used on an aircraft wing, as will be appreciated by the skilled person. In embodiments of the disclosure herein the trailing edge flight control surface is a flap. It may, for example, be a plain flap, a split flap, a slotted flap, a Fowler flap, or any other flight control surface as would be understood by a skilled person.

According to a twelfth aspect of the disclosure herein there is provided an aircraft comprising a control unit or control system according to any preceding aspect of the disclosure herein configured to control a geometry of the aircraft.

According to a thirteenth aspect of the disclosure herein there is provided a method of controlling a geometry of an aircraft comprising:
a) receiving a value concerning at least one parameter sensed by a sensing arrangement of an aircraft;
b) deriving a value concerning a lift to drag ratio of the aircraft, or of part of the aircraft, at at least one geometry of the aircraft, in dependence on the value concerning the at least one sensed parameter; and c) controlling a geometry of the aircraft in dependence on the derived value concerning the lift to drag ratio of the aircraft, so as to control the value concerning the lift to drag ratio.

Optionally the method comprises the step of deriving the value concerning the lift to drag ratio, at at least one geometry of the aircraft, at a current flight condition of the aircraft that is defined in dependence on at least one parameter sensed by a sensing arrangement of an aircraft.

Optionally the method comprises the step of deriving the value concerning the lift to drag ratio at at least one non-current geometry of the aircraft.

Optionally the method comprises the step of deriving a variation in the value concerning the lift to drag ratio with the variable geometry of the aircraft, at the current flight condition.

Optionally the method comprises the step of using a stored variation of the value concerning the lift to drag ratio with a variation in the geometry of the aircraft and with a variation in the flight condition, to derive the value concerning the lift to drag ratio, at at least one geometry of the aircraft, at the current flight condition.

Optionally the method comprises the step of updating the stored variation based on a further derivation of the variation of the value concerning the lift to drag ratio with a variation in the geometry of the aircraft and with a variation in the flight condition.

Optionally the method comprises the step of determining the maximum and/or minimum values concerning the lift to drag ratio that are achievable by varying the geometry of the aircraft, at the current flight condition.

Optionally the method comprises the step of determining the geometry of the aircraft that provides the maximum and/or minimum value concerning the lift to drag ratio.

Optionally the method comprises the step of deriving the value concerning the lift to drag ratio at the current geometry of the aircraft.

Optionally the method comprises the step of deriving a value concerning the lift generated by the aircraft, or the part of the aircraft, in dependence on at least one parameter sensed by a sensing arrangement of the aircraft.

Optionally the method comprises the step of determining the value concerning the lift to drag ratio in dependence on the value concerning lift.

Optionally the method comprises the step of providing a control command output, for controlling a geometry of the aircraft, to control the value related to the lift to drag ratio.

Optionally the method comprises the step of controlling the geometry of the aircraft, in dependence on the derived value concerning the lift to drag ratio at the at least one geometry of the aircraft, so as to control to a determined value concerning the lift to drag ratio.

Optionally the method comprises the step of controlling the geometry of the aircraft, at a plurality of flight conditions, such that the value concerning the lift to drag ratio is substantially the maximum achievable at each of those flight conditions.

Optionally the method comprises the step of controlling the geometry of the aircraft such that, during climb and cruise, the value concerning the lift to drag ratio is substantially the maximum achievable during climb and cruise respectively.

Optionally the method comprises the step of providing an output communication signal, for communicating a derived value concerning the current lift to draft ratio to a pilot of the aircraft.

Optionally the output communication signal is for communicating the value concerning the lift to drag ratio at the at least one non-current geometry of the aircraft to the pilot.

Optionally the output communication signal is for communicating the derived maximum and/or minimum values to the pilot.

Optionally the method comprises the step of controlling a surface of the aircraft such that forces and/or moments on the aircraft, about at least one axis of the aircraft, are balanced at a plurality of different aircraft geometries that are controlled to control the value related to lift to drag ratio.

Step (c) may comprise controlling the geometry of the aircraft automatically.

Alternatively, or additionally, step (c) may comprise controlling the geometry of the aircraft manually.

Optionally the method comprises the step of controlling at least one actuator to actuate a surface of the aircraft so as to vary the value concerning the lift to drag ratio of the aircraft, by varying the geometry of the aircraft, wherein the actuator is controlled by a control unit according to any preceding aspect of the disclosure herein.

Optionally the method comprises the step of controlling at least one actuator to actuate a surface of the aircraft so as to vary the value concerning the lift to drag ratio of the aircraft, by varying the geometry of the aircraft, wherein the actuator is controlled by a pilot of the aircraft.

Optionally the geometry of the aircraft that is controlled is the geometry of a wing of the aircraft.

Optionally the geometry that is controlled is the area and/or camber of the wing.

According to a fourteenth aspect of the disclosure herein there is provided a method of controlling a geometry of an aircraft comprising:
 a) receiving a value concerning at least one parameter, sensed by a sensing arrangement of an aircraft;
 b) deriving a value concerning the lift generated by the aircraft, or the part of the aircraft, in dependence on the at least one sensed parameter; and
 c) controlling a geometry of the aircraft, as to control a value concerning a lift to drag ratio of the aircraft, or of part of an aircraft, in dependence on the derived value concerning the lift.

Optionally the method comprises the step of controlling the geometry of the aircraft such that, during both climb and cruise of the aircraft, the value concerning the lift to drag ratio is substantially the maximum that is achievable by varying the geometry of the aircraft.

According to a fifteenth aspect of the disclosure herein there is provided a method of controlling a geometry of an aircraft comprising controlling a geometry of an aircraft such that at a first lift coefficient, during climb, a value concerning a lift to drag ratio of the aircraft, or of part of the aircraft, is substantially the maximum achievable and at a second lift coefficient, during cruise, the value concerning the lift to drag ratio is substantially the maximum achievable.

Optionally the second lift coefficient is greater than the first lift coefficient.

According to a sixteenth aspect of the disclosure herein there is provided a computer program product configured to cause, when the computer program is executed, a computer implemented control unit configured to perform the function of the control unit of any preceding aspect of the disclosure herein or to perform the method of controlling a geometry of an aircraft according to any preceding aspect of the disclosure herein.

The aircraft may be any air vehicle such as a manned aircraft or a UAV. More preferably the aircraft is a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the disclosure herein may be incorporated into other aspects of the disclosure herein. For example, the method of any aspect of the disclosure herein may incorporate any of the features described with reference to the apparatus of any aspect of the disclosure herein and vice versa.

Other preferred and advantageous features of the disclosure herein will be apparent from the following description.

The term 'or' shall be interpreted as 'and/or' unless the context requires otherwise.

BRIEF DESCRIPTION OF THE DRAWINGS

Embodiments of the disclosure herein will now be described by way of example only with reference to the accompanying drawings of which.

DETAILED DESCRIPTION

Figure 1:
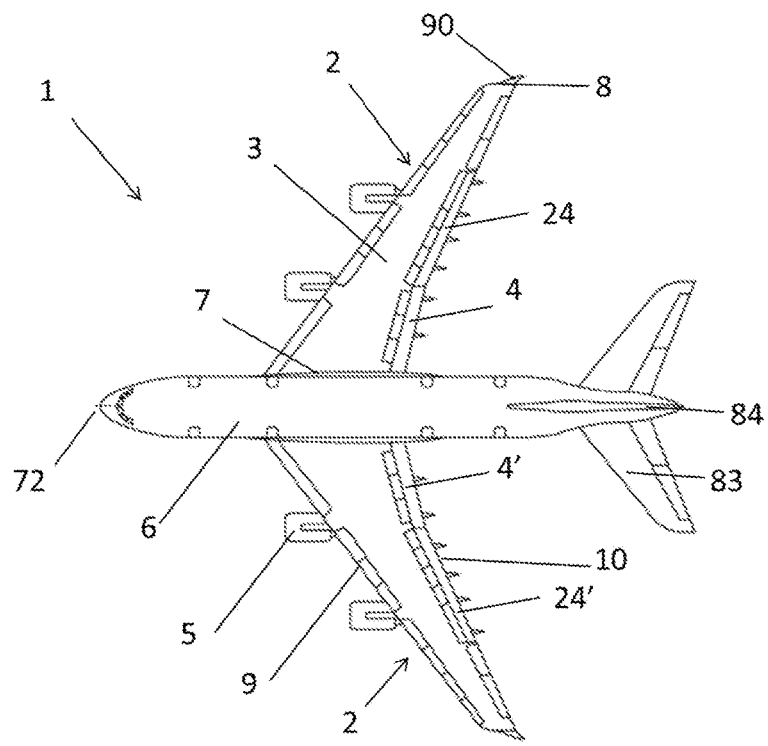
FIG. 1 shows a plan view of an aircraft according to a first embodiment of the disclosure herein.

FIG. 1 shows a plan view of an aircraft 1 according to a first embodiment of the disclosure herein. The aircraft 1 comprises first and second swept aircraft wings 2. It will be appreciated that each wing 2 is of corresponding construction and the description of one wing 2 applies to the other. Each aircraft wing 2 comprises a main wing 3 and inboard and outboard trailing edge control surfaces in the form of inboard and outboard flaps 4, 4', 24, 24' mounted at the trailing edge of the main wing 3.

The aircraft 1 is a passenger aircraft comprising a passenger cabin comprising a plurality of rows and columns of seat units for accommodating a multiplicity of passengers, in this case more than 50 passengers. The aircraft 1 is a powered aircraft and comprises engines 5, mounted under the wings 2, for propelling the aircraft 1.

For each wing 2, its main wing 3 extends outboard from the fuselage 6 of the aircraft 1, in a span wise direction from a root 7 to a tip 8 and in a chord-wise direction (c) (see FIG. 3) from a leading edge 9 to a trailing edge 10. A winglet 90 is provided at the end of each main wing 3.

Figure 2:
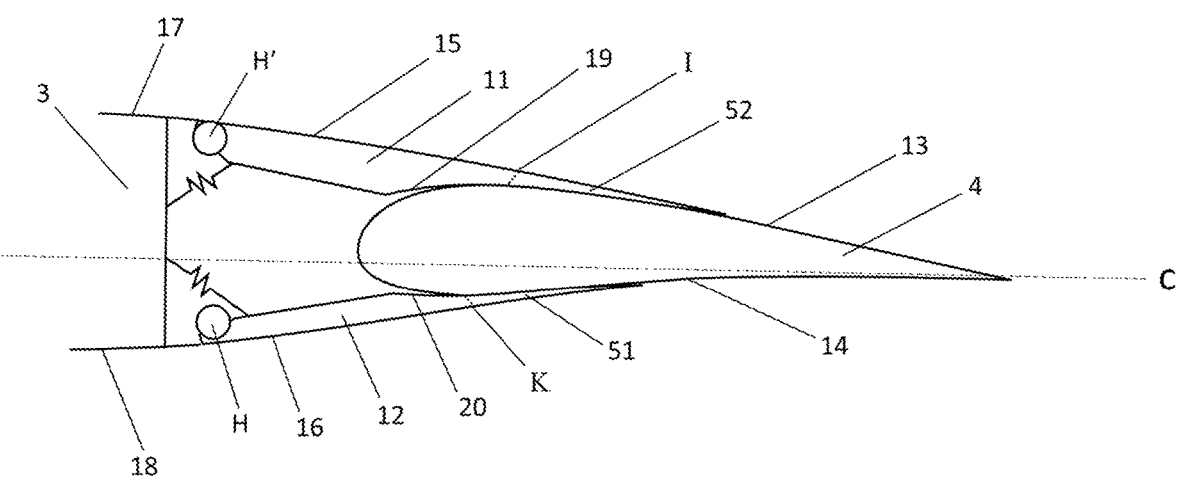
FIG. 2 shows a cross-sectional view of a trailing edge section and inboard flap of a wing of the aircraft shown in FIG. 1, where the flap is in a retracted position (and where an actuation mechanism of the spoiler, lower closure panel and flap is omitted for illustrative purposes)
Figure 3:
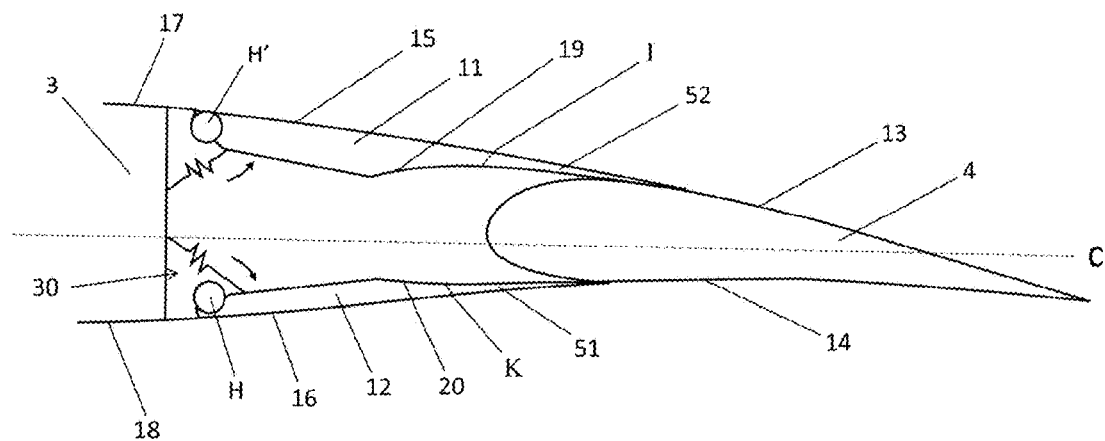
FIG. 3 shows a view corresponding to that of FIG. 2, where the trailing edge flap is in a first extended position.
Figure 4:
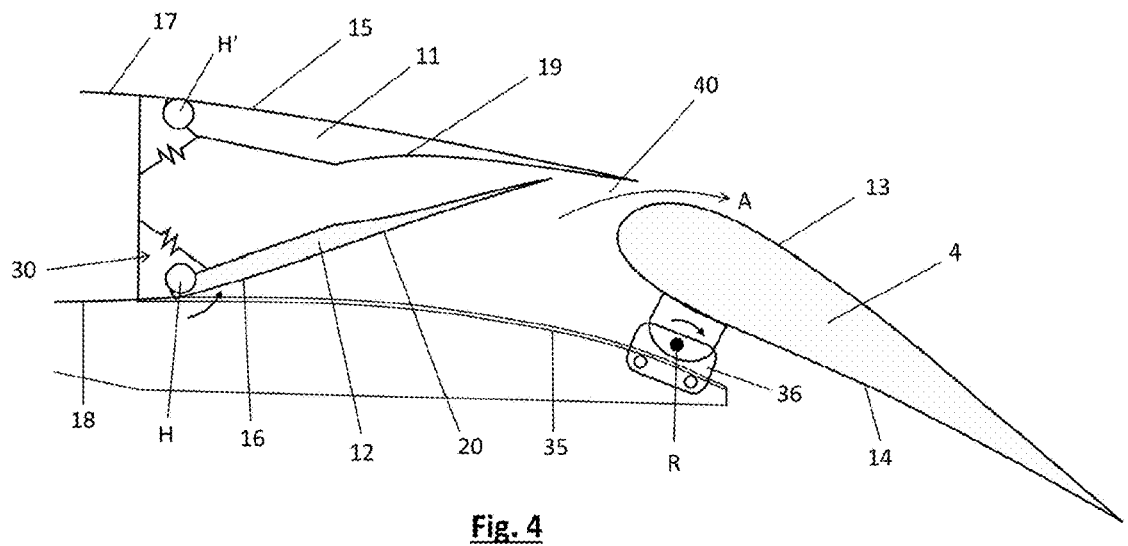
FIG. 4 shows a view corresponding to that of FIG. 2, but where the trailing edge flap is in a second extended position.

For each wing 2, the inboard flap 4 is movably mounted to the main wing 3 so as to move between a retracted position (as shown in FIG. 2), a first extended position (as shown in FIG. 3) and a second extended position (as shown in FIG. 4). The flap 4 is selectively movable to a plurality of positions between, and including, its retracted position, first extended position and second extended position. In this respect, the flap 4 is movable to provide a controllable continuous variation in the area and camber of the wing 2.

When the flap 4 is in its first extended position it is positioned rearwardly in the chord wise direction (c) (of the main wing 3) (see FIG. 2) relative to its retracted position, such that it in increases the planform area of the wing. It is also rotated downwardly slightly relative to its retracted position. In this respect the flap 4 is slightly rotated clockwise from its retracted position, about a rotational axis R, when looking along the axis R from its outboard end to its inboard end, and as it travels along a curved track 35, so as to increase the camber of the wing 2.

When the flap 4 is in its second extended position (see FIG. 4), it is rotated relative to its first extended position. It will be appreciated that when the flap 4 is in its second extended position, it is rotated relative to its retracted position. It is also positioned slightly rearwardly in the chord wise direction (c) (of the main wing 3) (see FIG. 2) relative to its first extended position.

The movement of the flap 4 between its retracted position, first extended position and second extended position allows the area and/or camber of the wing 2 to be continuously varied. Accordingly, the wing 2 has a continuously variable wing area and camber that allows the aerodynamic properties of the wing to be varied during flight (as well as on the ground) to optimise the wing for different flight conditions or phases of flight. For example, the wing area and camber may be reduced to a minimum to provide a low drag and low lift configuration suited to cruise conditions and the wing area and camber may be increased to a maximum to provide a high lift and high drag configuration suited to take off and landing. Furthermore, this allows the fine tuning of the geometry to maximise lift to drag ratio of the aircraft as its speed, altitude and weight varies during flight (described further below).

Figure 5:
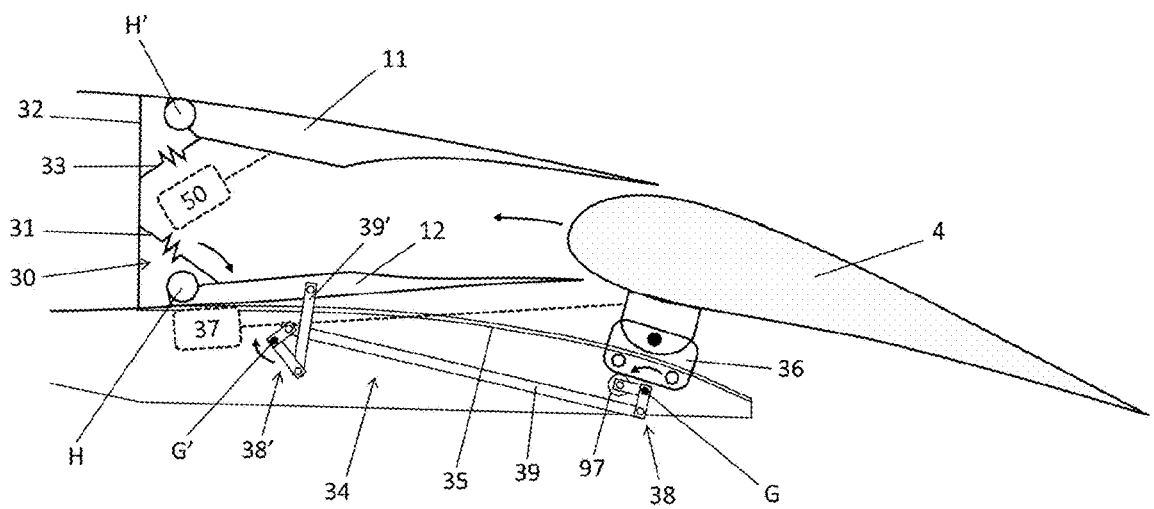
FIG. 5 shows a view corresponding to that of FIG. 2 but showing the flap in an intermediary position, moving from the second extended position to the first extended position (where the actuation mechanism is shown)

The flap 4 is mounted on a carriage 36 (see FIG. 5), which is movably mounted, on rollers, on a flap track 35 so as to travel along the flap track 35 to move the flap 4 between its retracted position, first extended position and second extended position. A flap actuator 37 (shown schematically in FIG. 5) is connected to the flap 4, so as to actuate the flap 4 between its retracted position, first extended position and a second extended position. In the currently described embodiment the actuator is a hydraulic actuator. However, it will be appreciated that any suitable type of actuator may be used, including a hydraulic actuator, a pneumatic actuator, a hybrid hydraulic/pneumatic actuator, an electromechanical actuator, etc.

The aircraft wing 2 comprises a spoiler 11 and a lower closure panel 12. The lower closure panel 12 is pivotally mounted to the trailing edge of the lower surface 18 of the main wing 3, to rotate about a hinge axis H proximal to the front of the closure panel 12. The hinge axis H is substantially parallel to the span wise direction of the main wing 3. The lower closure panel 12 is mounted to the trailing edge of the main wing 3, in the space between the trailing edge of the main wing 3 and the leading edge of the flap 4. The closure panel 12 is relatively thin and has a generally rectangular shape in plan form. It extends substantially across the span wise extent of the trailing edge flap 4, from its inboard end to its outboard end.

The spoiler 11 is pivotally mounted to the trailing edge of the upper surface 17 of the main wing 3, to rotate about a hinge axis H' proximal to the front of the spoiler 11. The hinge axis H' is substantially parallel to the span wise direction of the main wing 3. The spoiler 11 is mounted to the trailing edge of the main wing 3, in the space between the trailing edge of the main wing 3 and the leading edge of the flap 4. The spoiler 11 is relatively thin and has a generally rectangular shape in plan form. The spoiler 11 extends across the span wise extent of the trailing edge flap 4, from its outboard end to it inboard end. An actuator 50 (shown schematically in FIG. 5) is connected to the spoiler 11 so as to move the spoiler 11 between a retracted position, as shown in FIG. 2) and an extended position (shown (truncated) in a dotted outline in FIG. 5) in which the spoiler 11 is rotated upwardly (i.e. anti-clockwise about the rotational axis H', looking along the axis H' from the outboard end to the inboard end of the axis H') to a near vertical position so as to disrupt the airflow on the upper surface of the wing 2 so as to drastically reduce the lift produced by the wing 2, for example during landing of the aircraft 1.

When the flap 4 is in its retracted position (see FIG. 2), the lower closure panel 12 extends from the trailing edge of the main wing 3 to the flap 4. In this respect, an outer (lower) surface 16 of the closure panel 12 extends from a lower surface 18 of the main wing 3 to the lower surface 14 of the flap 4. The lower surface 18 of the main wing 3, the outer surface 16 of the lower closure panel 12 and the lower surface 14 of the flap 4 form a substantially clean aerodynamic shape. In this respect there are substantially no gaps between the surfaces 18, 16, 14, with the surfaces 18, 16, 14, forming a substantially continuous surface. In this respect, the outer surface 16 of the lower closure panel 12 forms a continuation of the lower surface 18 of the main wing 3 and the lower surface 14 of the flap 4 forms a continuation of the outer surface 16 of the lower closure panel 11. The surfaces 18, 16, 14 form a substantially smooth shape. In this respect, at the locations at which the surfaces meet each other, they are substantially parallel to each other.

The outer surface 16 of the lower closure panel 12 forms a connecting air flow surface between the lower surface 18 of the main wing 3 and the lower surface 14 of the flap 4. It will be appreciated that an 'air flow' surface is a surface that is exposed to air flow when the aircraft wing 2 is in use (i.e. in flight).

The lower closure panel 12 extends across the lower side of the gap between the trailing edge of the main wing 3 and the flap 4 so as to close the lower side of the gap. This prevents air from flowing into the gap between the trailing edge of the main wing 3 and the leading edge of the flap 4, through the lower side of the gap. This acts to reduce drag on the aircraft wing 2 and to improve handling properties of the aircraft 1.

A rear portion 20 of an inner surface of the lower closure panel 12 has a curved shape that is complimentary that of the portion of the lower surface 14 of the flap 4 that it is in contact with when the flap 4 is in its retracted position. This enables the flap 4 to form a close fit with the rear portion of the inner surface of the panel 12, and to slidingly engage with the inner surface of the panel 12, as the flap 4 is moved between its retracted position and its first extended position.

Furthermore, a rear portion 51 of the lower panel 12 (that extends from the rear end of the panel 12 to the dashed line (K) shown in FIG. 2) is made of a resiliently deformable material and configured such that the rear portion 51 conforms to the shape of the lower surface of the flap 4 that it is in contact with. In the current described embodiment the resiliently deformable material is in the form of CFRP. However, it will be appreciated that any suitable form of resilient deformable material may be used.

Similarly, when the flap 4 is in its retracted position, the spoiler 11 extends from the trailing edge of the main wing 3 to the flap 4. In this respect, an outer (upper) surface 15 of the spoiler 11 extends from an upper surface 17 of the main wing 3 to an upper surface 13 of the flap 4. The upper surface 17 of the main wing 3, the outer surface 15 of the spoiler and the upper surface 13 of the flap 4 form a substantially clean aerodynamic shape. In this respect there are substantially no gaps between the surfaces 17, 15, 13, with the surfaces 17, 15, 13, forming a substantially continuous surface. In this respect, the outer surface 15 of the spoiler 11 forms a continuation of the upper surface 17 of the main wing 3 and the upper surface 13 of the flap 4 forms a continuation of the outer surface 15 of the spoiler 11.

The surfaces 17, 15, 13 form a substantially smooth shape. In this respect, at the locations at which the surfaces meet each other, they are substantially parallel to each other. The outer surface 15 of the spoiler 11 forms a connecting air flow surface between the upper surface 17 of the main wing 3 and the upper surface 13 of the flap 4.

The spoiler 11 extends across the upper side of the gap between the trailing edge of the main wing 3 and the flap 4 so as to close the gap. This prevents air from flowing into the gap between the trailing edge of the main wing 3 and the leading edge of the flap 4, through the upper side of the gap. This acts to reduce drag on the aircraft wing 2 and to improve handling properties of the aircraft 1.

A rear portion 19 of an inner surface of the spoiler 11 has a curved shape that is complimentary that of the portion of the upper surface 13 of the flap 4 that it is in contact when the flap 4 is in its retracted position. This enables the flap 4 to form a close fit with the rear portion of the inner surface of the spoiler 11, and to slidingly engage with this surface, as the flap 4 is moved between its retracted position and its first extended position.

Furthermore, a rear portion 52 of the spoiler 11 (that extends from the rear end of the spoiler 11 to the dashed line (I) shown in FIG. 2) is made of a resiliently deformable material and configured such that the rear portion 52 conforms to the shape of the upper surface of the flap 4 that it is in contact with. In the current described embodiment, the resiliently deformable material is in the form of CFRP. However, it will be appreciated that any suitable form of resilient deformable material may be used.

As the flap 4 is moved rearwardly in the chordwise direction (c), from its retracted position to its first extended position, the lower closure panel 12 is moved by an actuation mechanism 34 (described further below) so as to maintain contact with the flap 4, to continue to provide the connecting air flow surface between the main wing 3 and flap 4. In this respect, the actuation mechanism 34 comprises a resiliently deformable member, in the form of a spring 31 (see FIG. 5), that is attached at a first end to a trailing edge spar 32 of the main wing 3 and at a second end to a front portion of the inner surface of the lower closure panel 12. The spring 31 is configured to bias the lower closure panel 12 against the lower surface of the flap 4 as the flap 4 is moved in the chord wise direction between its retracted position and its first extended position, so as to provide the connecting airflow surface between the trailing edge of the main wing 3 and the flap 4. In this respect, as the flap 4 is moved rearwardly in the chord wise direction (c), the contact of the flap 4 against the inner surface of the closure panel 12 acts to rotate the closure panel 12 clockwise about its hinge axis H (when viewed looking along the axis from its outboard end to its inboard end). However, the spring 31 acts to provide an opposite rotational force to the panel 12 such that the panel 12 is maintained in contact with the lower surface of the flap 4.

Accordingly, when the flap 4 is at any position between (and including) its retracted position and its first extended position, the lower closure panel 12 provides the connecting air flow surface between the main wing 3 and flap 4 and extends across the lower side of the gap between the trailing edge of the main wing 3 and flap 4 so as to close the gap (as in the retracted position of the flap 4).

Similarly, as the flap 4 is moved rearwardly in the chordwise direction (c), from its retracted position to its first extended position, the spoiler 11 is moved by an actuation mechanism so as to maintain contact with the flap 4, to continue to provide the connecting air flow surface between the main wing 3 and flap 4. In this respect, the actuation mechanism comprises a resiliently deformable member, in the form of a spring 33. The spring 33 is attached at a first end to the trailing edge spar 32 of the main wing 3 and at a second end to a front portion of the inner surface of the spoiler 11. The spring 33 is configured to bias the spoiler 11 against the upper surface of the flap 4 as the flap 4 is moved chord wise between its retracted position and its first extended position, so as to provide the upper connecting air flow surface between the trailing edge of the main wing 3 and the flap 4. In this respect, as the flap 4 is moved rearwardly in the chord wise direction (c), the contact of the flap 4 against the inner surface of the spoiler 11 acts to rotate the spoiler 11 anti-clockwise about its hinge axis H' (when viewed looking along the axis from its outboard end to its inboard end). However, the spring 33 acts to provide an opposite rotational force to the spoiler 11 such that the spoiler 11 is maintained in contact with the upper surface of the flap 4.

Accordingly, when the flap 4 is at any position between (and including) its retracted position and its first extended position, the spoiler 11 provides the upper connecting air flow surface between the main wing 3 and flap 4 and extends across the upper side of the gap between the trailing edge of the main wing 3 and flap 4 so as to close the gap (as in the retracted position).

Therefore, when the flap 4 is at any position between (and including) its retracted position and its first extended position, the lower closure panel 12 and spoiler 11 provide connecting air flow surfaces between the upper and lower surfaces of the main wing 3 and the upper and lower surfaces 13, 14 of the flap 4 that cover the gap between the trailing edge of the main wing 3 and the flap 4. This prevents air from flowing into the gap between the trailing edge of the main wing 3 and the leading edge of the flap 4, through the upper end of the gap. This acts to reduce drag on the aircraft wing 2 and to improve handling properties of the aircraft 1.

Furthermore, the trailing edge of the main wing 3, the spoiler 11, lower closure panel 12 and flap 4 form a substantially clean aerodynamic shape. This acts to further reduce drag on the aircraft wing 2 and to improve handling properties of the aircraft 1.

When the flap 4 is rotated to its second extended position (see FIG. 4) the lower closure panel 12 is rotated upwardly, i.e. in the anti-clockwise direction about its rotational axis H (when viewed looking along the rotational axis H from its outboard end to its inboard end) to an open configuration in which it opens an air flow passage, in the form of an air flow slot 40, defined between the flap 4 and the rear portion 19 of the inner surface of the spoiler 11. In this respect, the outer surface 16 of the closure panel 12 acts to guide the airflow into the slot 40. The spoiler 11 is also in an 'open configuration' as the flap 4 is spaced rearwardly in the chord wise direction (c) from the spoiler, to provide the slot 40. Alternatively, or additionally, the spoiler 11 may be moved, by a suitable actuation arrangement, to an open configuration to provide the slot 40.

When the flap 4 is in this position it has the general configuration of a slotted flap, in which the air flow through the slot 40 passes from the underside of the main wing (and lower closure panel 12) through the slot 40 and onto the upper surface 13 of the flap 4 (illustrated by arrow A in FIG. 4). This acts to maintain the attachment of the air flow along the upper surface 13 of the flap 4, thereby allowing the flap 4 to be operated at relatively high angles of attack without stalling.

As the flap 4 moves back from its second extended position to its first extended position, the actuation mechanism 34 (shown in FIG. 5) acts to rotate the lower closure panel 12 downwardly (i.e. clockwise about its rotational axis H, when looking along the axis H from its outboard end to its inboard end) just enough to allow the flap 4 to be received between the lower closure panel 12 and the spoiler 11.

The actuation mechanism 34 further comprises an abutment roller 97, an L-shaped linkage 38 that is connected at a first end to the abutment roller 97 and at a second end to a rod 39. The rod 39 extends from the second end of the L-shaped linkage 38 to an L-shaped linkage 38'. L-shaped linkage 38' is connected at a first end to rod 39 and at a second end to rod 39'. Rod 39' is connected at a first end to L-shaped linkage 38' and at a second end to the lower closure panel 12.

The abutment roller 97 is mounted to roll along a lower surface of the flap track carriage 35. The L-shaped linkage 38 is pivotally mounted so as to rotate about a rotational axis G and the L-shaped linkage 38' is pivotally mounted so as to rotate about a rotational axis G'.

As the flap 4 moves back towards its first extended position (from its second extended position), the flap track carriage 36 comes into abutment with the abutment roller 97, which acts to move the abutment roller 97 a short distance along the flap track carriage 35. This acts to rotate the L-shaped linkage 38 anticlockwise about its rotational axis G (when viewed looking along the axis G from its outboard end to its inboard end). This acts to pull the rod 39 generally rearwardly, which acts to rotate the L-shaped linkage 38' clockwise about its rotational axis G' (when viewed looking along the axis G from its outboard end to its inboard end). This acts to pull rod 39' generally downwardly which acts to rotate the lower closure panel 12 downwardly (i.e. clockwise about its rotational axis H when viewed looking along the axis from its outward end to its inboard end) just enough for the flap 4 to be received between the lower closure panel 12 and the spoiler 11.

It will be appreciated that any suitable actuation mechanism 34 may be used.

The outboard flap 24', 24', of each wing 2, is movably mounted to the main wing 3 in a corresponding way to that of the inboard flap 4, so as to move between corresponding retracted and extended positions. For conciseness, this will not be described in any further detail here.

The above-described wing 2 has a wing area and camber that are continuously variable, so as to vary the aerodynamic properties of the wing during flight (as well as on the ground), to optimise the wing for different flight conditions and flight phases, while having a closure arrangement that provides for a substantially clean aerodynamic shape of the wing at these different wing geometries. Furthermore, the closure arrangement allows the aircraft wing to have a slotted flap type arrangement, when the flap is in its second extended position, thereby allowing the flap to be operated at relatively high angles of attack without stalling.

Figure 6:
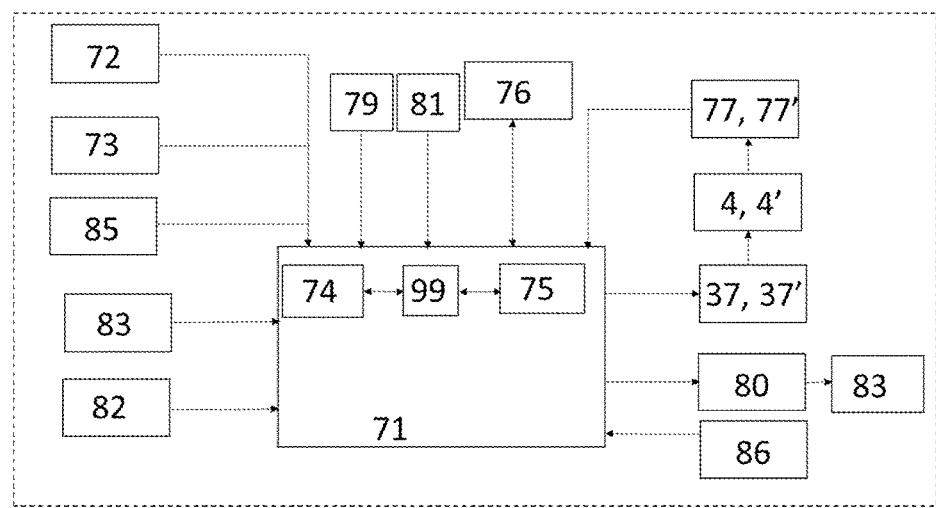
FIG. 6 shows a schematic diagram of a first embodiment of a control system of the aircraft for controlling the geometry of the wing by controlling the position of the flap.

Referring to FIG. 6 there is shown a schematic diagram of a first embodiment of a control system 70 of the aircraft 1, for controlling the geometry of the wing 2 by controlling the position of the inboard flap 4, 4' of each wing 2.

The control system 70 comprises a control unit 71, a pressure sensor 72, angle of attack sensor 73 and a flap position sensor 77, which each have an output connected to an input of the control unit 71.

In the described embodiments the control unit 71 is computer implemented. In this respect, the control unit 71 is implemented in hardware, for example computerized systems of the aircraft, by computer software. It will be appreciated of course that similar functions may be achieved by means other than software. A suitably arranged electronic circuit, whether or not comprising a programmable processing unit, could achieve an equivalent function.

Furthermore, it will be appreciated that any 'sub-units' of the control unit may be parts of such hardware, software and/or electronic circuits.

The hardware on which the control unit 71 is implemented may be hardware that performs other functions on the aircraft 1. For example, the hardware may be or form part of a general aircraft control system. The hardware may comprise other computer implemented control processes. Such other computer implemented control processes may, in any case, have access to all of the signals and/or data needed to ascertain the parameters, signals etc. that are used in embodiments of the disclosure herein. In this respect, the control unit may comprise at least part of an Aircraft Condition Monitoring System (ACMS) of the aircraft. The ACMS may receive as inputs, calculate and/or provide as outputs, one or more parameters used by/in the control unit. For example, the ACMS may calculate the Mach number that the aircraft 1 is flying at based on a measured outside temperature.

As such, the computer implementation of the control unit 71 of embodiments of the disclosure herein may be achieved solely by a change in software in the hardware on the aircraft that performs other control functions. The computer implementation of the control unit of embodiments of the disclosure herein may be performed as a retro-fit.

It will be appreciated that the control unit 71 may comprise one or more components (e.g sub-units), which may be located in the same or different parts of the aircraft. In this respect, it will be appreciated that the control unit does not have to be formed by a single unit (at one location on the aircraft).

The pressure sensor 72 is a pitot-static probe 72 configured to measure the static and dynamic pressure of the oncoming airflow during flight. In the currently described embodiment the pitot-static probe is mounted at the nose of the aircraft (see FIG. 1). However, it will be appreciated that any suitable type of pressure sensor and any suitable location of the pressure sensor may be used.

Figures 11A, 11B:
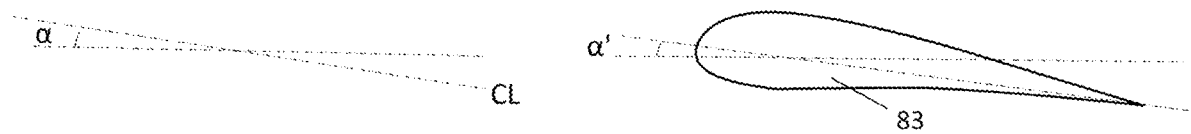
FIG. 11a is a schematic diagram illustrating the definition of the angle of attack ($\alpha$) of the aircraft.
FIG. 11b is a schematic diagram illustrating the definition of the pitch angle ($\alpha'$) of the horizontal tail plane of the aircraft.

The angle of attack sensor unit 73 is configured to measure the angle of attack ($\alpha$) of the aircraft 1 (see FIG. 11*a*). In the currently described embodiment the reference line used to measure the angle of attack is the centre line (CL) of a straight section of the fuselage of the aircraft. However, it will be appreciated that any suitable reference line of the aircraft may be used. In the currently described embodiment the angle of attack sensor 73 is of the pivoted vane type. However, it will be appreciated that any suitable type of angle of attack sensor may be used, including a pivoted vane, differential pressure tube or null-seeking pressure tube, for example.

Each flap 4, 4' has a respective flap 4 position sensor arrangement 77, 77' configured to sense the chord wise and rotational position of the flap 4. It will be appreciated that the flap 4 position sensor arrangement 77, 77' may comprise one or more sensors. In the currently described embodiment the flap position sensor arrangement 77 comprises a linear variable displacement transducer and a rotary variable differential transducer arranged to measure the chord wise and rotational position of the flap 4. However, it will be appreciated that any suitable position sensor arrangement may be used, including a displacement transducer inductive non-contact position sensors, potentiometer, optical sensor, eddy-current sensor, etc.

The control unit 71 also comprises a processing unit 99. The processing unit comprises a processor programmed with software. However, it will be appreciated that any type of processor unit may be used. Outputs of each of the each of the sensors of the control system 70 are connected to inputs of the processing unit 99. For clarity these connections are shown schematically to the control unit 71, but it will be appreciated that these connections pass to the processing unit 99 of the control unit 71.

The processing unit 99 calculates the total plan form area of the wings 2 based on the sensed position of the flap 4, 4' of each wing. In this respect, the control unit 71 comprises a first memory unit 74 that stores a variation of total plan form wing area with position of the flaps 4, 4'. The memory unit 74' may be implemented by any suitable type of hardware (e.g. solid-state storage or electromechanical storage). The processing unit 99 is connected to the first memory unit 74 (to exchange data with the first memory unit 74). This stored variation may be determined using empirical or theoretical means. In the currently described embodiment this stored variation is in the form of a look-up table and the processing unit 99 is configured to interpolate, if necessary, between specific values stored in the look-up table, to calculate the values of total plan form wing area in dependence on the sensed position of the flaps 4, 4'. It will be appreciated that any suitable type of stored variation may be used, including a variation in the form of discrete values (e.g. on which interpolation may be used) or that is continuous (e.g. an equation).

The processing unit 99 accesses the first memory 74 and, using the sensed position of the flap 4, and the stored variation in the first memory 74, derives the total plan form area of the wings 2.

The control system 70 also comprises a landing gear pressure sensor arrangement 82 configured to measure the aircraft weight at take-off, i.e. when the aircraft 1 is on the ground and to output this to the control unit 71, more specifically to the processing unit 99. It will be appreciated that the landing gear pressure sensor arrangement 82 may comprise one or more pressure sensors of any suitable type.

The control system 70 also comprises a fuel burn rate sensor 83 configured to sense the rate at which fuel has been burnt throughout the course of the flight (which may vary over time) and to output this to the control unit 71, more specifically to the processing unit 99.

The processing unit 99 calculates the current aircraft gross weight (W) from the measurement of the weight of the aircraft at takeoff and the measurement of the rate of fuel burnt during flight. Such a calculation of the current aircraft gross weight (W) is conventional and will not be described in any further detail here.

From the measured static and dynamic pressures, angle of attack ($\alpha$), flap position and aircraft gross weight (W), the processing unit 99 calculates the current lift coefficient of the aircraft ($CL_{AC}$).

In the currently described embodiment the lift coefficient of the aircraft ($CL_{AC}$) is calculated according to the following equation:

$$CL_{AC} = \frac{W}{\frac{1}{2}\rho V^2 S} \qquad \text{Equation 1}$$

Where:
$CL_{AC}$=Lift coefficient of aircraft
W=Current aircraft gross weight (kg)
$\rho$=air density (kg/m$^3$)
V=air speed (m/s)
S=Wing planform area (m$^2$) (i.e. the combined planform area of both wings 2)

The pitot static probe 72 is used to determine the dynamic pressure ($\frac{1}{2}\rho V^2$) used in Equation 1, through a subtraction of the static pressure from the total pressure (each of these pressures being measured by the pitot static probe 72).

According to this method, the control unit 71 (i.e. its processing unit 99) calculates the aircraft lift coefficient ($CL_{AC}$) continuously in real time, during flight of the aircraft, based on continuous real time sensed/derived values of the dynamic pressure, current aircraft gross weight (W) and wing plan form area (S), using the outputs of the respective sensors.

It will be appreciated that terms of this equation are modified, as appropriate, to take into account where the flight path angle of the aircraft is inclined upwardly or downwardly, based appropriate force body equations, to take into account thrust and drag. Such equations are conventional and well known to the skilled person and so will not be described in any further detail here.

The control system 70 further comprises a temperature sensor 85 arranged to measure the outside air temperature and to output the measured temperature to the control unit 71, more specifically the processing unit 99.

The processing unit 99 is configured to calculate the Mach number, that the aircraft 1 is flying at, using the pressure measured from the pitot-static tube 72 and using the outside air temperature measured by the temperature sensor 85.

In the currently described embodiment the processing unit 99 calculates the Mach number according to the following equation:

$$M = \frac{v}{c} \qquad \text{Equation 2}$$

Where:
M=Mach Number
v=the local velocity of the airflow (m/s)
c=the local speed of sound (m/s)

In this respect, the local speed of sound (c) (m/s) is calculated according to:

$$c = \sqrt{\gamma RT} \qquad \text{Equation 3}$$

Where:
$\gamma$=adiabatic index
R=molar gas constant (J/kg·K)
T=local outside air temperature (K) (measured by the temperature sensor (85))

The velocity of the airflow (v) is calculated from the dynamic pressure obtained from the pitot static pressure sensor (72) and using a value obtained for the density of the airflow at that altitude. It will be appreciated that any known method of obtaining a value for the density of the airflow may be used (e.g. using a known variation with altitude and/or using one or more sensors).

Furthermore, it will be appreciated that any suitable method of calculating the Mach number may be used. For example, the Mach number could be calculated without a measurement of the outside air temperature, using only a measurement of the static and dynamic pressures.

The use of the Mach number, in the calculation of the lift to drag ratio (L/D) of the aircraft, will be described further below.

The control unit 71 also comprises a second memory unit 75, connected to the processing unit 99, that stores a variation of the values of the lift to drag ratio (L/D) of the aircraft 1 with the variation in geometry of the wing 2, due to a variation in position of the flap 4, 4', the derived lift coefficient of the aircraft ($CL_{AC}$) and the derived Mach number that the aircraft is flying at.

In the currently described embodiment this stored variation is in the form of a look-up table and the processing unit 99 is configured to interpolate, if necessary, between specific values stored in the look-up table to derive values of the lift to drag ratio (L/D) of the aircraft 1 based on the geometry of the wing 2, using the outputs of the flap position sensor 77, 77', the derived lift coefficient of the aircraft ($CL_{AC}$) and the derived Mach number that the aircraft is flying at. It will be appreciated that any suitable type of stored variation may be used, including a variation in the form of discrete values (e.g. on which interpolation may be used) or that is continuous (e.g. an equation).

From the determined lift coefficient of the aircraft ($CL_{AC}$), geometry of the wing 2 and Mach number, the processing unit 99 uses this stored variation to determine the value of lift to drag ratio of the aircraft (L/D) at the current geometry of the aircraft (i.e. at the current position of the flap 4, 4'), at the current flight condition of the aircraft.

In the currently described embodiment the current flight condition is defined by a set of parameters in the form of the combination of the current lift coefficient of the aircraft ($CL_{AC}$) and the current Mach No. that the aircraft is flying at. However, it will be appreciated that a different set of parameters (including one or more measured and/or derived parameters) may be used to define the current 'flight condition'.

The processing unit 99 also uses this stored variation to determine the lift to drag ratio (L/D) of the aircraft at non-current aircraft geometries, i.e. at different positions of the flap 4, 4' so as to determine the variation of the lift to drag ratio (L/D) with flap position at the current flight condition. This is again done using the look up table and, if necessary, using interpolation, as described above.

The processing unit 99 then uses this derived variation of the lift to drag ratio to determine the maximum and minimum values of the lift to drag ratio (L/D) of the aircraft 1 that are achievable at the current flight condition (i.e. at the current value of lift coefficient of the aircraft ($CL_{AC}$) and the current Mach no.) by varying the geometry of the wing 2, i.e. by varying the position of the flap 4, 4'.

From the determined maximum and minimum values of the achievable lift to drag ratio (L/D) and the stored variation (in the second memory unit 75), the processing unit 99 also determines the respective wing geometries (i.e. position of the flap 4, 4') that provide the maximum and minimum values of the achievable lift/drag (L/D) of the aircraft 1, at the current flight condition.

The current value of the lift to drag ratio (L/D) of the aircraft and the maximum and minimum achievable values of the lift to drag ratio (L/D) at the current flight condition are determined continuously, in real time, during flight of the aircraft, based on continuous real time sensed values from the respective aircraft sensors. It will also be appreciated that the flight condition (i.e. the lift coefficient of the aircraft ($CL_{AC}$) and the Mach no.) may vary continuously, with the determination also taking this into account.

The control unit 71 (namely its processing unit 99) is configured to automatically control the position of the flaps 4, 4' so as to automatically control the lift to drag ratio (L/D) of the aircraft 1, i.e. to provide a desired lift to drag ratio at the current flight condition. In order to provide this control, an output of the processing unit 99 is connected to the flap actuator 37, 37' (of each flap) so as to control the position of the flap 4, 4' (for clarity this is shown generally as a connection of the control unit 71 to the flap actuator 37, 37', however it will be appreciated that an output of the processing unit 99 is connected to the flap actuator 37, 37') to a position that provides a desired value of the L/D ratio. In the currently described embodiment the flap position is controlled in dependence on the determined value of the current lift to drag ratio (L/D) of the aircraft (to provide a form of closed-loop control), as well as in dependence on the derived variation of the lift to drag ratio with variation in flap position, at the current flight condition.

Alternatively, the flap position may be controlled to a position calculated to provide a desired lift to drag ratio at the current flight condition, using the derived variation of the lift to drag ratio with variation in flap position, at the current flight condition, without reference to the lift to drag ratio provided by the current flap position, i.e. in effect a form of open loop control.

It will be appreciated that although, in the schematic diagrams of the embodiments of the control system 70, only one box is shown for each flap 4, 4', flap position sensor 77, 77' or flap actuator 37, 37', each flap 4, 4' may have a different (or the same) flap actuator 37, 37' and has a different flap position sensor 77, 77'. Each flap 4, 4' may be controllable independently or together, by the control unit 71.

The control unit 71 is configured to provide a plurality of different types of automatic control of the flaps 4, 4', that are selectable by the pilot. In this regard, the control system 70 comprises a pilot operable control 79, located in the cockpit of the aircraft 1. An output of the pilot operable control 79 is connected to an input of the control unit 71, more specifically to an input of the processing unit 99.

The pilot operable selector 79 has a plurality of pilot selectable settings. When a first setting is selected, the control unit 71 (i.e. its processing unit 99) controls the position of the flaps 4, 4' so as to automatically control the lift to drag ratio (L/D) of the aircraft to be within the minimum and maximum achievable lift to drag ratio (L/D) of the aircraft 1.

When a second setting is selected, the control unit 71 controls the position of the flaps 4, 4' so as to automatically control the lift to drag ratio (L/D) of the aircraft to be at a certain percentage of the maximum and/or minimum achievable value of the lift to drag ratio (L/D) at the current flight condition. This percentage is also selected via the pilot operable control 79.

When a third setting is selected, the control unit 71 controls the position of the flaps 4, 4' so as to automatically control the lift to drag ratio (L/D) of the aircraft to be at the maximum achievable value of the lift to drag ratio (L/D) at the current flight condition.

When a fourth setting is selected, the control unit 71 controls the position of the flaps 4, 4' so as to automatically control the lift to drag ratio (L/D) of the aircraft to be at the minimum achievable value of the lift to drag ratio (L/D) at the current flight condition.

When a fifth setting is selected, the control unit 71 controls the position of the flaps 4, 4' so as to automatically control the lift to drag ratio (L/D) of the aircraft 1 to be at certain values in dependence on the determined lift coefficient of the aircraft ($CL_{AC}$).

In this respect, during climb, the determined lift coefficient of the aircraft ($CL_{AC}$) is less than that during cruise. When in this setting, the control unit 71 controls the position of the flaps 4, 4' so as to automatically control the lift to drag ratio (L/D) of the aircraft 1 to be at substantially the maximum achievable (by varying the position of the flaps 4, 4') during both climb and cruise of the aircraft. The control unit 71 is configured to determine the phase that the aircraft is in (e.g. whether or not it is in climb or cruise) based on at least the determined lift coefficient of the aircraft ($CL_{AC}$). Other measured and/or derived parameters may also be used to determine whether the aircraft is in climb or cruise. During climb the aircraft 1 is at a first lift coefficient and during cruise the aircraft 1 is at second lift coefficient. The second lift coefficient is greater than the first lift coefficient.

Figure 7:
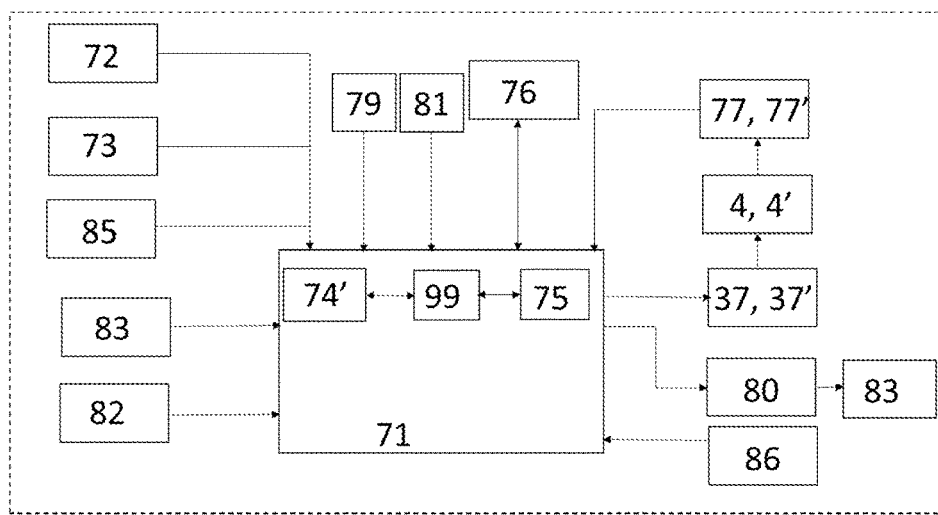
FIG. 7 shows a schematic diagram of a second embodiment of a control system of the aircraft for controlling the geometry of the wing by controlling the position of the flap.

A second embodiment of the control system 70' is shown in FIG. 7. The second embodiment of the control system 70' is the same as the first embodiment 70, except for the differences described below. Corresponding features are given corresponding reference numerals.

The control system 70' of the second embodiment is the same as the control system 70 of the first embodiment, except in that instead of the first memory unit 74 (that stores the variation of total wing area with the position of the flaps 4, 4'), the control unit 71 comprises a first memory unit 74' that stores a variation of the lift coefficient of the aircraft ($CL_{AC}$) with the angle of attack ($\alpha$) of the aircraft 1, at different geometries of the aircraft, i.e. at different positions of the flaps 4, 4'.

This stored variation may be determined using empirical or theoretical means. This stored variation is in the form of a look-up table and the processing unit 99 is configured to interpolate, if necessary, between specific values stored in the look-up table (e.g. specific values of angle of attack ($\alpha$) or flap position), to calculate the values of the lift coefficient of the aircraft ($CL_{AC}$) depending on the sensed angle of attack ($\alpha$) of the aircraft 1 and on the current aircraft geometry (e.g. flap position). It will be appreciated that any suitable type of stored variation may be used, including a variation in the form of discrete values (e.g. on which interpolation may be used) or that is continuous (e.g. an equation). The derived values of lift coefficient of the aircraft ($CL_{AC}$) are then used in the same way as in the first embodiment of the control system 70.

Figure 8:
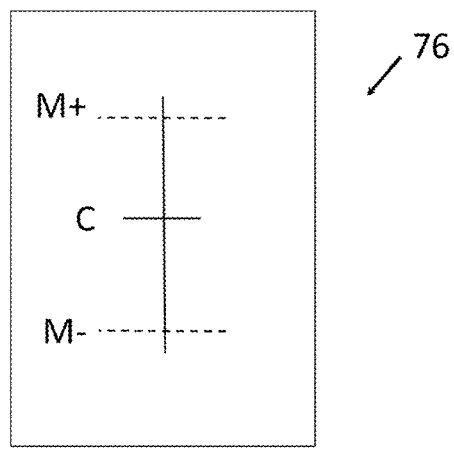
FIG. 8 shows a schematic view of a cockpit display of the control system of FIGS. 6 and 7.

Referring to FIG. 8, there is shown a schematic view of a cockpit display 76 of the control system of FIGS. 6 and 7 (i.e. where the control system is automatic). The cockpit display 76 is connected to an output of the control unit 71 (namely of the processing unit 99—but again shown generally from the control unit 71 for clarity), so as to be controlled by the control unit 71. In the currently described embodiment the display is a liquid crystal display. However, it will be appreciated that any suitable type of display may be used, including an electrical and/or mechanical display.

In this respect, the derived current value of the lift to drag ratio (L/D) of the aircraft is displayed to the pilot on a cockpit display 76 as a horizontal bar (C) that moves vertically, along a scale. The calculated maximum and minimum values of the achievable lift/drag (L/D) of the aircraft 1 (by varying the position of the flaps 4) at the current flight condition (i.e. the current Mach number and aircraft lift coefficient) are displayed as horizontal bars (M+, M−). It will be appreciated that the horizontal bars (M+, M−) move vertically, along the scale as the flight condition changes (since this will alter the maximum and minimum values of the achievable lift/drag (L/D) of the aircraft 1).

The display 76 is updated continuously to show the pilot the current lift to drag ratio (L/D) of the aircraft 1 and the maximum and minimum values of the achievable lift/drag (L/D) of the aircraft 1 (with the variation in flap position) at the current flight condition.

Figure 9:
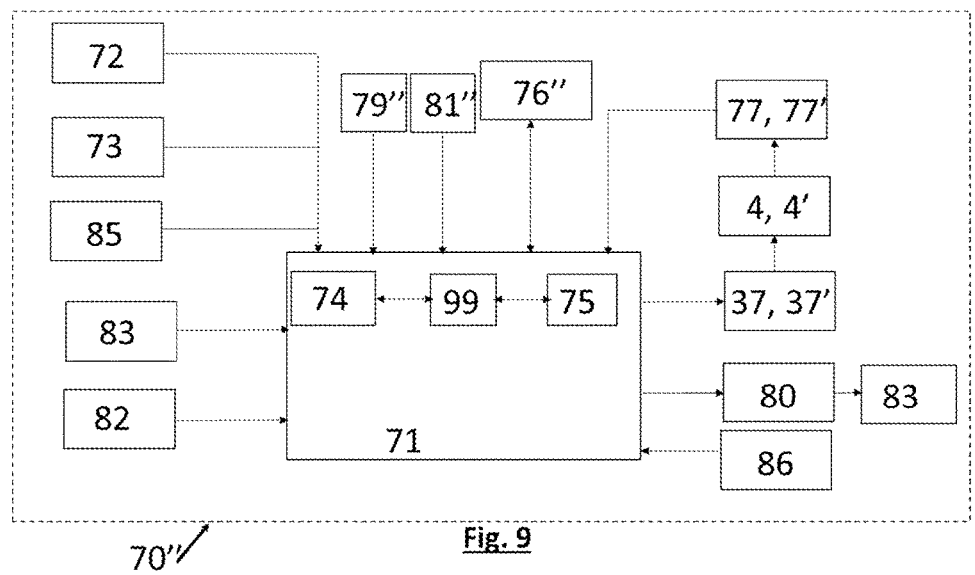
FIG. 9 shows a schematic diagram of a third embodiment of a control system of the aircraft for controlling the geometry of the wing by controlling the position of the flap.

Referring to FIG. 9, there is shown a third embodiment of the control system 70". The third embodiment of the control system 70" is the same as the first embodiment 70, except for the differences described below. Corresponding features are given corresponding reference numerals.

The control system 70" of the third embodiment is the same as the control system 70 of the first embodiment, except in that it is for being manually operated to manually control the position of the flaps 4, 4' so as to control the lift to drag ratio (L/D) of the aircraft 1.

In this respect, the control system has a pilot operable control 79", instead of the pilot operable selector 79. The pilot operable control 79" has an output that is connected to an input of the control unit 71 (namely an input of the processing unit 99). In this respect, the pilot operable control 79" is connected to the flap actuators 37, 37', via the control unit 71, to control the position of the flaps 4, 4'.

Figure 10:
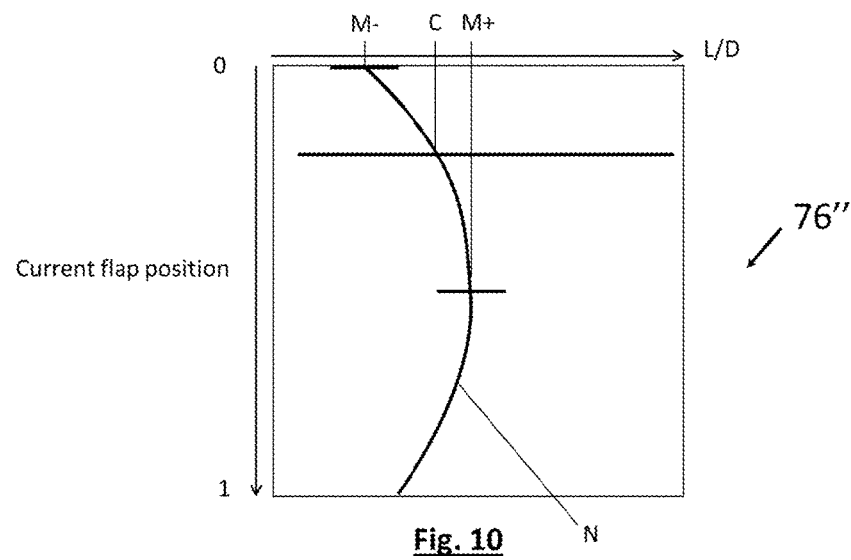
FIG. 10 shows a schematic view of a cockpit display of the control system of FIG. 9.

Referring to FIG. 10, there is shown a schematic view of a cockpit display 76" of the control system of FIGS. 9, i.e. where the control system is manually operable. The horizontal (X) axis is the lift to drag ratio (L/D) of the aircraft 1 and the vertical (Y) axis is the current flap position, with '0' being where the flap 4, 4' is in its retracted position and '1' being where the flap 4, 4' is in its first extended position.

The processing unit 99 calculates what the lift to drag ratio (L/D) of the aircraft 1 would be if the position of the flaps 4, 4' were varied, at the current flight condition (i.e. at the current lift coefficient of the aircraft and the current Mach No.). The processing unit 99 does this by using the stored variation (in the second memory unit 75) of the lift to drag ratio (L/D) of the aircraft 1, with lift coefficient of the aircraft, Mach No. and aircraft geometry (flap position) to determine the value of the lift to drag ratio at different flap positions at the current flight condition. The lift to drag ratio at these different geometries, at the current flight condition, is displayed as the (curved) line N.

The maximum and minimum values of the achievable lift/drag (L/D) of the aircraft 1 (by varying the position of the flaps 4) at the current flight condition are shown at the points on the line N labelled M+ and M−. The calculation of what the lift to drag ratio (L/D) of the aircraft would be if the flap 4 position was varied, at the current flight condition, is performed continuously as the flight condition changes. Accordingly, the line N may be constantly changing.

The processing unit 99 determines the lift to drag ratio (L/D) of the aircraft 1 at the current wing geometry (current flap position) and the current flight condition (as in the previous embodiments of the control system) and this is displayed as the horizontal line (C). In this respect, the current lift to drag ratio (L/D) is shown by the intersection of the horizontal line (C) with the line N.

The line N allows the pilot to deduce which way the lift to drag ratio will vary, for a certain change in the flap position. Accordingly, this enables the pilot to manually vary the position of the flap 4, to control to a desired lift to drag ratio (L/D) of the aircraft 1. It also allows the pilot to control to a lift to drag ratio (L/D) that is within the maximum and minimum L/D that is achievable by varying the flap position, at the current flight condition.

The control unit 71 also comprises a limiter that prevents the flaps 4, 4' being moved to a position, during high-speed flight, that would cause damage to the aircraft.

The aircraft 1 has a tail comprising a horizontal stabilizer 83 and a vertical stabilizer 84 (see FIG. 1).

For each of the described embodiments of the control system 70, 70', 70", the control system comprises an actuator 80 configured to change the pitch angle ($\alpha'$) (see FIG. 11b) of the horizontal stabilizer 83. An output of the control unit 71 (namely of the processing unit 99) is connected to the actuator 80, to provide for this control.

In the control system 70, 70' of the first and second embodiments, the control unit 71 is configured to automatically control the actuator 80, to control the pitch angle ($\alpha'$) of the horizontal stabilizer 83 so as to as to automatically trim the aircraft 1. In this respect, the control unit 71 automatically controls the pitch angle ($\alpha'$) of the horizontal stabilizer 83 so as to balance pitching moments on the aircraft 1, so that there is no net pitching moment, i.e. the aircraft is balanced in pitch. This frees the pilot from having to exert a constant pressure on the controls so as to maintain balance pitching moments on the aircraft 1, for example to maintain horizontal flight (or to maintain a constant rate of climb or cruise).

In order to provide this control, the control system comprises a pitch rate sensor 86 configured to sense the rate of pitch of the aircraft 1. An output of the pitch rate sensor 86 is connected to an input of the of control unit 71 (more specifically an input of the processing unit 99), to provide the processing unit 99 with the sensed pitch rate of the aircraft 1.

The control unit 71 (namely the processing unit 99) controls the actuator 80, to control the pitch angle of the horizontal stabilizer 83, in dependence on the sensed pitch rate, so as to control the pitch rate to zero.

This control is performed continuously, to balance the aircraft in pitch, as the geometry of the aircraft 1 changes, for example as the position of the flaps 4, 4' change to control the lift to drag ratio of the aircraft 1 (as described above).

The automatic control is turned on and off by a pilot operable control 81 in the cockpit of the aircraft 1.

In the third embodiment of the control system 70", the trim control is performed manually by a pilot. In this respect, the control system 70" comprises a pilot operable trim control 81" (instead of the control 81 to turn the automatic trim control on/off), in the form of a trim wheel, located in the cockpit of the aircraft 1. The trim control 81 is connected to the control unit 71, which then passes trim commands to the horizontal stabilizer 83 such that the pilot can manually control the pitch angle of the horizontal stabilizer 83, so as to manually trim the aircraft 1. In this respect, it allows the pilot to control the pitch angle of the horizontal stabilizer 83, so as balance pitching moments on the aircraft 1 for a certain flight condition and geometry of the aircraft 1, i.e. for a certain position of the flaps 4, 4'. As in the first and second embodiments of the control system, this frees the pilot from having to exert a constant pressure on the controls so as to maintain balance pitching moments on the aircraft 1, for example to maintain horizontal flight (or to maintain a constant rate of climb or cruise).

In each of the described embodiments, the control unit 71 is configured to update the stored variation, in the second memory unit 75, of the lift to drag ratio (L/D) of the aircraft, with flap position, lift coefficient and Mach number, over time using a second, more accurate method of measurement. For example, a measurement of the drag coefficient may be made based on the overall fuel used by the aircraft over time. This drag coefficient may be used, with the determined lift coefficient, to obtain values for the L/D ratio. These values maybe used to update the stored variation in the second memory unit 75 (e.g. to update the lookup table) so that the stored variation is made more accurate over time, based on real-world factors. In the currently described embodiment machine learning is used to update the stored variation in this way, to increase its accuracy. It will be appreciated that any suitable type of machine learning may be used (e.g. using neural networks).

Figure 12:
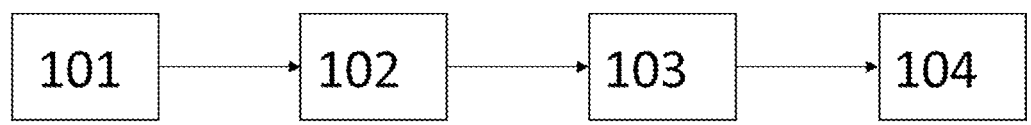
FIG. 12 is a flow chart illustrating the steps of a method of controlling the geometry of the aircraft according to a further embodiment of the disclosure herein.

It will be appreciated that a method of control of the geometry of the aircraft (by controlling the flap position), using one or more of the described embodiments of the control system, comprises (with reference to FIG. 12):
a) receiving a value concerning at least one parameter sensed by a sensing arrangement of an aircraft (step 101);
b) deriving a lift coefficient of the aircraft from the value concerning the at least one sensed parameter (step 102);
c) deriving a value concerning a lift to drag ratio of the aircraft at at least one geometry of the aircraft, using the derived lift coefficient and the stored variation in the second memory unit (75) (step 103); and
d) controlling a geometry of the aircraft in dependence on the derived value concerning the lift to drag ratio of the aircraft, so as to control the value concerning the lift to drag ratio (step 104).

Figure 13:
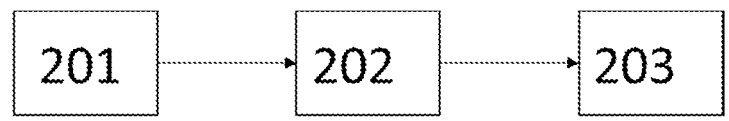
FIG. 13 is a flow chart illustrating the steps of a method of controlling the geometry of the aircraft according to a further embodiment of the disclosure herein.

It will also be appreciated that a method of control of the geometry of the aircraft (by controlling the flap position), where the fifth setting of automatic control is selected (or when manual control is used) comprises (with reference to FIG. 13):
a) receiving a value concerning at least one parameter, sensed by a sensing arrangement of an aircraft (step 201);
b) deriving a value concerning the lift generated by the aircraft in dependence on the at least one sensed parameter (step 202); and
c) controlling a geometry of the aircraft, as to control a value concerning to a lift to drag ratio of the aircraft in dependence on the derived value concerning the lift (step 203).

Figure 14:
FIG. 14 is a flow chart illustrating the steps of a method of controlling the geometry of the aircraft according to a further embodiment of the disclosure herein.

It will also be appreciated that a method of control of the geometry of the aircraft (by controlling the flap position), where the fifth setting of automatic control is selected (or when manual control is used) comprises (with reference to FIG. 14) controlling a geometry of an aircraft such that at a first lift coefficient, during climb (step 301), a value concerning a lift to drag ratio of the aircraft is substantially the maximum achievable and at a second lift coefficient, during cruise (step 302), the value concerning the lift to drag ratio is substantially the maximum achievable. As stated above, the second lift coefficient is greater than the first lift coefficient.

Accordingly, in the control system of each of the above-described embodiments, while the aircraft 1 is in flight, the control system 70, 70', 70" continuously determines the lift to drag ratio of the aircraft 1 in dependence on the outputs of a number of sensors of the aircraft 1. In the automatic control system 70, 70' of the first and second embodiments, the control system automatically controls the position of the flaps 4, 4' so as to automatically control the lift to drag ratio of the aircraft 1. This may be to set the lift to drag ratio to a certain value, for example a certain percentage of the maximum or minimum lift to drag ratio that is achievable at that flight condition (by varying the position of the flaps 4, 4'). It may be to set the lift to drag ratio to be the maximum or minimum that is achievable at that flight condition. It may be to set the control the lift to drag ratio to be at certain values in dependence on the determined lift coefficient of the aircraft. The control unit 71 also automatically controls the pitch angle of the horizontal stabilizer 83 so as to continuously trim the aircraft 1 at the different geometries of the aircraft (e.g. the different positions of the flaps 4, 4') and at the different flight conditions.

In the control system 70" according to the third embodiment, the lift to drag ratio is displayed to the pilot, with the pilot manually controlling the position of the flaps 4, 4', to control the lift to drag ratio, in dependence on the displayed lift to drag ratio. The pilot also manually controls the pitch angle of the horizontal stabilizer 83 so as to trim the aircraft 1 at the different geometries of the aircraft (e.g. the different positions of the flaps 4, 4') and at the different flight conditions.

Providing a control system 70 that allows the geometry of the aircraft 1 to be varied to provide a desired lift to drag ratio of the aircraft 1 advantageously effectively provides an additional 'axis' of control of the aircraft 1 (i.e. an additional parameter than can be controlled). In this respect, it may allow the aircraft to be flown at a maximum achievable lift to draft ratio of the aircraft at different flight conditions. For example, it allows the aircraft to have a first geometry during climb such that the lift coefficient of the aircraft is maximised during climb and to have a second geometry during cruise such that the lift coefficient of the aircraft is maximised during cruise. This advantageously allows for fuel burn of the aircraft to be reduced. Furthermore, it may allow the aircraft 1 to be flown at a minimum achievable lift to drag ratio of the aircraft, for example during descent (on landing approach) so as to slow the aircraft 1.

Furthermore, because the wing is configured to provide for a continuous variation in the wing geometry, i.e. a continuous variation in area and camber of the wing by variation of the flap position, the lift to drag ratio can be controlled to a high degree and can be continuously controlled.

While the disclosure herein has been described and illustrated with reference to particular embodiments, it will be appreciated by those of ordinary skill in the art that the disclosure herein lends itself to many different variations not specifically illustrated herein.

For example, in the described embodiment both the lower closure panel 12 and the (upper) spoiler 11 form a respective 'closure panel' that extends from the main wing 3 to the flap 4, to provide an air flow surface between the main wing 3 and flap 4, when the flap 4 is in its retracted position and its first extended position. Alternatively, only one of the lower closure panel 12 and spoiler 11 may be arranged to form such a closure panel.

In the described embodiment the wing 2 comprises an actuation mechanism 34 arranged to move the lower closure panel 12 such that it contacts the flap 4 when the flap 4 is in its retracted position and its first extended position. Alternatively, such an actuation mechanism may be omitted. For example, the lower closure panel 12 may be fixedly attached to the trailing edge of the main wing 3. As the flap 4 is moved between its retracted position and its first extended position, the path of the flap 4 may be such that a surface of the flap 4 contacts a surface of the lower closure panel 12. Such an arrangement may alternatively, or additionally, be used for the spoiler 11.

In the described embodiment the flap 4 translates and rotates, as it moves in a chord wise direction between its retracted position and its first extended position. However, the flap 4 could only do one of these, for example it may only translate. Similarly, in the described embodiment the flap 4 rotates and translates as it moves between its first extended position and its second extended position. However, it may only do one of these, for example if may only rotate.

In the currently described embodiment the flap 4 moves sequentially from its retracted position to its first extended position and then to its second extended position. Alternatively, the flap 4 may be movably mounted such that it is movable between the retracted position, first extended position and second extended position in any order of movement. For example, the flap 4 may be movable from the retracted position to the second extended position before it is movable to the first extended position.

In the described embodiment the trailing edge control surface is a flap 4. However, it will be appreciated that the trailing edge flight control surface may be any trailing edge flight control surface used on an aircraft wing, including a flap, aileron or flaperon, for example.

In the described embodiments, the control unit determines the lift to drag ratio of the aircraft in dependence on the output of a number of sensors of the aircraft, in conjunction with one or more stored variations of how a certain parameter varies with the variation in one or more other parameters.

The use of the specific parameters that are measured, by the sensors, in the described embodiments, as well as the use of the specific driving variables and driven variables used in the stored variation(s) are particularly advantageous as they provide a relatively accurate determination of the lift to drag ratio of the aircraft. Furthermore, they provide for a relatively computationally efficient determination of the lift to drag ratio.

However, it will be appreciated that the disclosure herein is not limited to the use of the specific parameters that are measured, by the sensors, or to the specific driving variables or driven variables and that stored variation(s) relate to.

In this respect, different parameters may be measured by the sensors and the stored variations may have different driving and driven variables.

As an example, the control system may comprise a stored variation of the drag coefficient of the aircraft ($CD_{AC}$) with the lift coefficient of the aircraft ($CL_{AC}$) for each state of the variable aircraft geometry (i.e. for each position of the flap 4, 4'). As in the described embodiments, this may be based on empirical and/or theoretical values. The control unit 71 may use this stored variation to 'look up' the drag coefficient ($CD_{AC}$) of the aircraft at the determined current lift coefficient ($CL_{AC}$) (the lift coefficient being determined as in the described embodiments), so as to determine the current drag coefficient ($CD_{AC}$) of the aircraft 1. The current lift to drag ratio of the aircraft may then be obtained by dividing the determined lift coefficient ($CL_{AC}$) by the drag coefficient ($CD_{AC}$).

Furthermore, the lift to drag ratio of the aircraft may be determined based on an output of only one sensor of the aircraft, for example based on a pressure sensor and suitable stored variations.

In the currently described embodiments the control system is used to control the lift to drag ratio of the aircraft. However, the control system may be configured to control the lift to drag ratio of only a part of the aircraft, for example of the wings of the aircraft, the tale of the aircraft, etc.

In the currently described embodiments the geometry of the aircraft is varied, to vary the lift to drag ratio, by varying the position of the flaps 4, 4'. This is particular advantageous as the flaps 4, 4' provide for a continuous change in cord and/or camber of the wing 2, thereby providing a high degree of control over the lift to drag ratio. However, it will be appreciated that any controllable surface of the aircraft may be controlled so as to control the lift to drag ratio of the aircraft, including control surfaces that change the shape continuously, as well as control surfaces that change their shape discreetly. Furthermore, a leading edge control surface may be used.

In the currently described embodiments the lift to drag ratio of the aircraft is calculated for the current aircraft geometry (i.e. the current flap position) and for non-current aircraft geometries (i.e. that different positions of the flap would provide) at the current flight condition. Alternatively, the lift to drag ratio may only be calculated for the current aircraft geometry (e.g. to display to a pilot). Alternatively, the lift to drag ratio may only be calculated for non-current aircraft geometries (i.e. to allow the flap position to be varied to provide a desired lift to drag ratio).

In the currently described embodiment the horizontal stabilizer is controlled so as to trim the aircraft in terms of the pitch of the aircraft. It will be appreciated that the control system may alternatively, or additionally, control other surfaces of the aircraft so as to balance forces in the direction of and/or moments about one or more of the three orthogonal axes of the aircraft, i.e. the x,y,z axes, namely the pitch, roll and yaw axes of the aircraft.

It will be appreciated that the 'control' unit may provide automatic control or may provide for manual control.

The aircraft may be any type of aircraft, including any air vehicle, such as a manned aircraft or a UAV. However, the aircraft is preferably a passenger aircraft.

In some embodiments, the disclosure herein can comprise a control unit for a variable geometry aircraft, configured to:
 a) receive a value concerning at least one parameter, sensed by a sensing arrangement of an aircraft; and
 b) derive a value concerning a lift to drag ratio of the aircraft, or of part of the aircraft, at at least one geometry of the aircraft, in dependence on the value concerning the at least one sensed parameter.

In some embodiments, the disclosure herein can comprise a control unit as above wherein the control unit is configured to derive the value concerning the lift to drag ratio, at at least one geometry of the aircraft, at a current flight condition of the aircraft, wherein the current flight condition is defined by a set of parameters, the set of parameters comprising at least one parameter that is sensed by a sensing arrangement of the aircraft or is derived in dependence on at least one parameter that is sensed by a sensing arrangement of the aircraft.

In some embodiments, the disclosure herein can comprise a control unit as above wherein the control unit is configured to derive the value concerning the lift to drag ratio at at least one non-current geometry of the aircraft, at the current flight condition.

In some embodiments, the disclosure herein can comprise a control unit as above wherein the control unit is configured to derive a variation in the value concerning the lift to drag ratio with the variable geometry of the aircraft, at the current flight condition.

In some embodiments, the disclosure herein can comprise a control unit as above wherein the control unit is configured to use a stored variation of the value concerning the lift to drag ratio with a variation in the geometry of the aircraft and with a variation in the flight condition, to derive the value concerning the lift to drag ratio, at at least one geometry of the aircraft, at the current flight condition.

In some embodiments, the disclosure herein can comprise a control unit as above wherein the control unit is configured such that the stored variation is updated based on a further derivation of the variation of the value concerning the lift to drag ratio with a variation in the geometry of the aircraft and with a variation in the flight condition.

In some embodiments, the disclosure herein can comprise a control unit as above wherein the control unit is configured to determine the maximum and/or minimum values concerning the lift to drag ratio that are achievable by varying the geometry of the aircraft, at the current flight condition.

In some embodiments, the disclosure herein can comprise a control unit as above wherein the control unit is configured to determine the geometry of the aircraft that provides the maximum and/or minimum value concerning the lift to drag ratio.

In some embodiments, the disclosure herein can comprise a control unit wherein the control unit is configured to derive the value concerning the lift to drag ratio at the current geometry of the aircraft.

In some embodiments, the disclosure herein can comprise a control unit wherein the control unit is configured to derive a value concerning the lift generated by the aircraft, or the part of the aircraft, in dependence on at least one parameter sensed by a sensing arrangement of the aircraft.

In some embodiments, the disclosure herein can comprise a control unit wherein the control unit is configured to determine the value concerning the lift to drag ratio in dependence on the value concerning lift.

In some embodiments, the disclosure herein can comprise a control unit wherein the control unit is configured to provide a control command output, for controlling a geometry of the aircraft, to control the value related to the lift to drag ratio.

In some embodiments, the disclosure herein can comprise a control unit wherein the control unit is configured to control the geometry of the aircraft, in dependence on the derived value concerning the lift to drag ratio at the at least one geometry of the aircraft, so as to control to a determined value concerning the lift to drag ratio.

In some embodiments, the disclosure herein can comprise a control unit wherein the control unit is configured to control the geometry of the aircraft, at a plurality of flight conditions, such that the value concerning the lift to drag ratio is substantially the maximum achievable at each of those flight conditions.

In some embodiments, the disclosure herein can comprise a control unit wherein the control unit is configured to control the geometry of the aircraft such that, during climb and cruise, the value concerning the lift to drag ratio is substantially the maximum achievable during climb and cruise respectively.

In some embodiments, the disclosure herein can comprise a control unit wherein the control unit is configured to provide an output communication signal, for communicating a derived value concerning the current lift to draft ratio to a pilot of the aircraft.

In some embodiments, the disclosure herein can comprise a control unit wherein the output communication signal is for communicating the value concerning the lift to drag ratio at the at least one non-current geometry of the aircraft to the pilot.

In some embodiments, the disclosure herein can comprise a control unit wherein the output communication signal is for communicating the derived maximum and/or minimum values to the pilot.

In some embodiments, the disclosure herein can comprise a control unit wherein the control unit is configured to control a surface of the aircraft, so as to control forces and/or moments on the aircraft, and wherein the control unit is configured to control the surface, such that forces and/or moments on the aircraft, about at least one axis of the aircraft, are balanced at a plurality of different aircraft geometries that are controlled to control the value related to lift to drag ratio.

In some embodiments, the disclosure herein can comprise a control unit for a variable geometry aircraft, configured to:
 a) receive a value concerning at least one parameter, sensed by a sensing arrangement of an aircraft;
 b) derive a value concerning the lift generated by the aircraft, or by the part of the aircraft, in dependence on the at least one sensed parameter; and c) control a geometry of the aircraft, as to control a value related to a lift to drag ratio of the aircraft, or of part of an aircraft, in dependence on the derived value concerning the lift.

In some embodiments, the disclosure herein can comprise a control unit wherein the control unit is configured to control the geometry of the aircraft such that, during both climb and cruise of the aircraft, the value concerning the lift to drag ratio is substantially the maximum that is achievable by varying the geometry of the aircraft.

In some embodiments, the disclosure herein can comprise a control unit configured to control a geometry of an aircraft such that at a first lift coefficient, during climb, a value concerning a lift to drag ratio of the aircraft, or of part of the aircraft, is substantially the maximum achievable and at a second lift coefficient, during cruise, the value concerning the lift to drag ratio is substantially the maximum achievable.

In some embodiments, the disclosure herein can comprise a control system comprising a control unit as described anywhere herein and at least one actuator configured to actuate a surface of the aircraft so as to vary the value concerning the lift to drag ratio of the aircraft, by varying the geometry of the aircraft, wherein the actuator is controlled by the control unit.

In some embodiments, the disclosure herein can comprise a control system comprising a control unit as disclosed anywhere herein and at least one actuator configured to actuate a surface of the aircraft so as to vary the value concerning the lift to drag ratio of the aircraft, by varying the geometry of the aircraft, wherein the actuator is controllable by a pilot of the aircraft.

In some embodiments, the disclosure herein can comprise a control unit or control system as disclosed anywhere herein wherein the geometry of the aircraft that is controlled is the geometry of a wing of the aircraft.

In some embodiments, the disclosure herein can comprise a control unit or control system as described anywhere herein wherein the geometry that is controlled is the area and/or camber of the wing.

In some embodiments, the disclosure herein can comprise an aircraft comprising an aircraft wing, or a control unit or control system as described anywhere herein configured to control a geometry of the aircraft.

In some embodiments, the disclosure herein can comprise a method of controlling a geometry of an aircraft comprising:
  a) receiving a value concerning at least one parameter sensed by a sensing arrangement of an aircraft;
  b) deriving a value concerning a lift to drag ratio of the aircraft, or of part of the aircraft, at at least one geometry of the aircraft, in dependence on the value concerning the at least one sensed parameter; and
  c) controlling a geometry of the aircraft in dependence on the derived value concerning the lift to drag ratio of the aircraft, so as to control the value concerning the lift to drag ratio.

In some embodiments, the disclosure herein can comprise a method of controlling a geometry of an aircraft comprising:
  a) receiving a value concerning at least one parameter, sensed by a sensing arrangement of an aircraft;
  b) deriving a value concerning the lift generated by the aircraft, or the part of the aircraft, in dependence on the at least one sensed parameter; and
  c) controlling a geometry of the aircraft, as to control a value concerning a lift to drag ratio of the aircraft, or of part of an aircraft, in dependence on the derived value concerning the lift.

In some embodiments, the disclosure herein can comprise a method comprising controlling the geometry of the aircraft such that, during both climb and cruise of the aircraft, the value concerning the lift to drag ratio is substantially the maximum that is achievable by varying the geometry of the aircraft.

In some embodiments, the disclosure herein can comprise a method of controlling a geometry of an aircraft comprising controlling a geometry of an aircraft such that at a first lift coefficient, during climb, a value concerning a lift to drag ratio of the aircraft, or of part of the aircraft, is substantially the maximum achievable and at a second lift coefficient, during cruise, the value concerning the lift to drag ratio is substantially the maximum achievable.

In some embodiments, the disclosure herein can comprise a computer program product configured to cause, when the computer program is executed, a computer implemented control unit configured to perform the function of the control unit as described anywhere herein or to perform the method of controlling a geometry of an aircraft as described anywhere herein.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing comprising:
  a main wing;
  a trailing edge flight control surface that is movable between a retracted position, a first extended position, in which the flight control surface is positioned rearwardly in a chord wise direction relative to the retracted position, and a second extended position, in which the flight control surface is rotated relative to the retracted position; and
  a closure panel mounted to the main wing such that a chord wise position of the flight control surface relative to that of the closure panel is varied as the flight control surface is moved between the retracted position and the first extended position;
wherein the closure panel extends from the main wing to the flight control surface to provide an air flow surface between the main wing and the flight control surface, both when the flight control surface is in the retracted position and when the flight control surface is in the first extended position;
wherein the closure panel is movable, relative to the flight control surface, to an open configuration in which the closure panel opens an airflow passage provided between the flight control surface and an opposed surface of the aircraft wing when the flight control surface is in the second extended position;
wherein the closure panel extends from a lower surface of the main wing;
wherein, when the flight control surface is in the retracted position, the closure panel extends from the lower surface of the main wing to a lower surface of the flight control surface; and
wherein, when the flight control surface is in the first extended position, the closure panel extends from the lower surface of the main wing to a lower surface of the flight control surface.

2. The aircraft wing according to claim 1, wherein:
the closure panel is movably mounted to the main wing; and
the aircraft wing comprises an actuator configured to move the closure panel such that the closure panel extends from the main wing to the flight control surface to provide the air flow surface, both when the flight control surface is in the retracted position and when the flight control surface is in the first extended position.

3. The aircraft wing according to claim 1, wherein:
the closure panel is a first closure panel; and
the aircraft wing comprises a second closure panel that extends from an upper surface of the main wing to an upper surface of the flight control surface to provide an air flow surface, both when the flight control surface is in the retracted position and when the flight control surface is in the first extended position.

4. The aircraft wing according to claim 3, comprising an actuator configured to actuate the second closure panel, such that the second closure panel extends from the upper surface of the main wing to the upper surface of the flight control surface to provide the air flow surface, both when the flight control surface is in the retracted position and when the flight control surface is in the first extended position.

5. The aircraft wing according to claim 3, wherein the aircraft wing is configured such that, when the flight control surface is in the retracted position, the flight control surface is at least partially received between the first and second closure panels.

6. The aircraft wing according to claim 3, comprising a spoiler and the spoiler comprises the closure panel.

7. The aircraft wing according to claim 1, wherein the closure panel has an inner surface that has a complimentary shape to that of an outer surface of the flight control surface.

8. The aircraft wing according to claim 7, wherein:
the closure panel is a first closure panel and extends from a lower surface of the main wing to a lower surface of the flight control surface to provide an air flow surface, when the flight control surface is in the retracted position and when the flight control surface is in the first extended position;
the aircraft wing comprises a second closure panel that extends from an upper surface of the main wing to an upper surface of the flight control surface to provide an air flow surface, both when the flight control surface is in the retracted position and when the flight control surface is in the first extended position;
the first and second closure panels have opposed inner surfaces;
the inner surface of the first closure panel has a complimentary shape to that of the lower surface of the flight control surface; and
the inner surface of the second closure panel has a complimentary shape to that of the upper surface of the flight control surface.

9. The aircraft wing according to claim 1, wherein the closure panel comprises a deformable portion configured such that, when in contact with control surface, the deformable portion deforms to conform to a shape of the flight control surface.

10. An aircraft wing comprising:
a main wing;
a trailing edge flight control surface that is movable between a retracted position, a first extended position, in which the flight control surface is positioned rearwardly in a chord wise direction relative to the retracted position, and a second extended position, in which the flight control surface is rotated relative to the retracted position;
a first closure panel mounted to the main wing such that the chord wise position of the flight control surface relative to that of the first closure panel is varied, as the flight control surface is moved between the retracted position and the first extended position; and
a second closure panel mounted to the main wing such that the chord wise position of the flight control surface relative to that of the second closure panel is varied, as the flight control surface is moved between the retracted position and the first extended position;
wherein, when the flight control surface is in the retracted position and when the flight control surface is in the first extended position:
the first closure panel extends from a lower surface of the main wing to a lower surface of the flight control surface to provide an air flow surface between the lower surface of the main wing and the lower surface of the flight control surface; and
the second closure panel extends from an upper surface of the main wing to an upper surface of the flight control surface to provide an air flow surface between the upper surface of the main wing and the upper surface of the flight control surface.

11. The aircraft wing according to claim 10, comprising, for each of the first closure panels and/or for each of the second closure panels, a corresponding actuator configured to actuate the first or second closure panel, with which the corresponding actuator is associated, to extend from the main wing to the flight control surface to provide the air flow surface, both when the flight control surface is in the retracted position and when the flight control surface is in the first extended position.

12. A method of changing a position of a trailing edge flight control surface of an aircraft wing, the method comprising:
moving the flight control surface along the curved track between a retracted position, a first extended position, in which the flight control surface is positioned rearwardly in a chord wise direction relative to the retracted position, and a second extended position, in which the flight control surface is rotated relative to the retracted position;

wherein the aircraft wing comprises a main wing;

wherein the aircraft wing comprises a closure panel mounted to the main wing, such that a chord wise position of the flight control surface relative to that of the closure panel is varied, as the flight control surface is moved between the retracted position and the first extended position;

wherein the closure panel extends from the main wing to the flight control surface to provide an air flow surface between the main wing and the flight control surface, both when the flight control surface is in the retracted position and when the flight control surface is in the first extended position;

wherein the closure panel is moved, relative to the flight control surface, to an open configuration, in which the closure panel opens an airflow passage provided between the flight control surface and an opposed surface of the aircraft wing when the flight control surface is in the second extended position;

wherein the closure panel extends from a lower surface of the main wing;

wherein, when the flight control surface is in the retracted position, the closure panel extends from the lower surface of the main wing to a lower surface of the flight control surface; and wherein, when the flight control surface is in the first extended position, the closure panel extends from the lower surface of the main wing to a lower surface of the flight control surface.

13. A method of changing a position of a trailing edge flight control surface of an aircraft wing, the method comprising:

moving the flight control surface between a retracted position, a first extended position, in which the flight control surface is positioned rearwardly in a chord wise direction relative to the retracted position, and a second extended position, in which the flight control surface is rotated relative to the retracted position;

wherein the aircraft wing comprises a main wing;

wherein the aircraft wing comprises a first closure panel mounted to the main wing, such that a chord wise position of the flight control surface relative to that of the first closure panel is varied, as the flight control surface is moved between the retracted position and the first extended position;

wherein the aircraft wing comprises a second closure panel mounted to the main wing, such that a chord wise position of the flight control surface relative to that of the first closure panel is varied, as the flight control surface is moved between the retracted position and the first extended position; and wherein, when the flight control surface is in the retracted position and when the flight control surface is in the first extended position;

the first closure panel extends from a lower surface of the main wing to a lower surface of the flight control surface to provide an air flow surface between the lower surface of the main wing and the lower surface of the flight control surface; and the second closure panel extends from an upper surface of the main wing to an upper surface of the flight control surface to provide an air flow surface between the upper surface of the main wing and the upper surface of the flight control surface.

14. The aircraft wing of claim 1, wherein the flight control surface is attached to a track by a flap track carrier that is movable along the track with the flight control surface.

15. The aircraft wing of claim 14, wherein the flap track carrier is attached to a lower surface of the flight control surface.

16. The aircraft wing of claim 15, wherein the flight control surface is rotatable relative to a rotational axis R defined by the flap track carrier as the flap track carrier and the flight control surface travel along the track to increase a camber of the aircraft wing.

17. The method of claim 12, wherein the flight control surface is attached to the track by a flap track carrier that is movable along the curved track with the flight control surface.

18. The method of claim 17, wherein:

the flap track carrier is attached to a lower surface of the flight control surface; and the flight control surface is rotatable relative to a rotational axis R defined by the flap track carrier as the flap track carrier and the flight control surface travel along the track to increase a camber of the aircraft wing.

\* \* \* \* \*

UNITED STATES PATENT AND TRADEMARK OFFICE
CERTIFICATE OF CORRECTION

PATENT NO. : 12,214,879 B2
APPLICATION NO. : 17/733080
DATED : February 4, 2025
INVENTOR(S) : Mark Shaun Kelly Page 1 of 1

It is certified that error appears in the above-identified patent and that said Letters Patent is hereby corrected as shown below:

In the Claims

Column 38, Line 64: "along the curved track" should be removed.

Column 40, Line 36: "along the curved track with the flight control" should be -- along the track with the flight control --.

Signed and Sealed this
Ninth Day of September, 2025

Coke Morgan Stewart
*Acting Director of the United States Patent and Trademark Office*